United States Patent
Elshafie et al.

(10) Patent No.: US 12,255,738 B2
(45) Date of Patent: Mar. 18, 2025

(54) CHANNEL FEEDBACK FOR UPDATING MODULATION AND CODING SCHEME

(71) Applicant: QUALCOMM Incorporated, San Diego, CA (US)

(72) Inventors: Ahmed Elshafie, San Diego, CA (US); Wei Yang, San Diego, CA (US); Wanshi Chen, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 17/344,596

(22) Filed: Jun. 10, 2021

(65) Prior Publication Data

US 2022/0399952 A1    Dec. 15, 2022

(51) Int. Cl.
*H04L 1/00* (2006.01)

(52) U.S. Cl.
CPC .......... *H04L 1/0009* (2013.01); *H04L 1/0003* (2013.01)

(58) Field of Classification Search
CPC ... H04L 1/0009; H04L 1/0003; H04L 1/0015; H04L 1/1671; H04L 1/1819; H04L 1/1864; H04L 1/0025
See application file for complete search history.

(56) References Cited

U.S. PATENT DOCUMENTS

2023/0208565 A1* 6/2023 Yang .................... H04B 7/0626
370/252

OTHER PUBLICATIONS

Ericsson, R1-2104218, "CSI Feedback Enhancement for IIoT/URLLC", 3GPP TSG-RAN WG1 Meeting #105, Electronic meeting, May 2021 (Year: 2021).*
Samsung, R1-2105303, "CSI Report Enhancements for URLLC", 3GPP TSG-RAN WG1 #105, e-Meeting, May 2021 (Year: 2021).*
OPPO, R1-2104803, "CSI feedback enhancements for URLLC", 3GPP TSG RAN WG1 #105-e, e-Meeting, May 2021 (Year: 2021).*
Ericsson: "CSI Feedback Enhancements for IIoT/URLLC", R1-2104218, 3GPP TSG-RAN WG1 Meeting #105, 3rd Generation Partnership Project (3GPP), Mobile Competence Centre, 650, Route Des Lucioles, F-06921 Sophia-Antipolis Cedex, France, vol. RAN WG1, No. Electronic Meeting, May 10, 2021-May 27, 2021, May 12, 2021 (May 12, 2021), XP052010678, 17 Pages, Sections 2.2.1-2.2.2.

(Continued)

*Primary Examiner* — Gary Mui
*Assistant Examiner* — Yewon Kim
(74) *Attorney, Agent, or Firm* — Guang Y. Zhang; Holland & Hart LLP

(57) ABSTRACT

Methods, systems, and devices for wireless communications are described. A base station may transmit a data message to a user equipment (UE) in a data block modulated according to a modulation and coding scheme (MCS). The UE may monitor for the data block and may attempt to decode the data block. If the UE successfully receives and decodes the data block, the UE may transmit an acknowledgment (ACK) in a feedback message. If the UE unsuccessfully receives or decodes the data block, the UE may transmit a negative acknowledgement (NACK). The UE may transmit the feedback message with the ACK or NACK and a value from a codebook indicating for the base station to increase or decrease the MCS by a delta value for a following transmission or a retransmission.

30 Claims, 15 Drawing Sheets

(56) References Cited

OTHER PUBLICATIONS

International Search Report and Written Opinion—PCT/US2022/031039—ISA/EPO—Sep. 2, 2022.
OPPO: "CSI Feedback Enhancements for URLLC", R1-2104803, 3GPP TSG RAN WG1 #105-e, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 12, 2021 (May 12, 2021), XP052011044, 6 Pages, Section 2.2.
Samsung: "CSI Report Enhancements for URLLC", 3GPP TSG RAN WG1 #105, R1-2105303, 3rd Generation Partnership Project (3GPP), Mobile Competence Centre, 650, Route Des Lucioles, F-06921 Sophia-Antipolis Cedex, France, vol. RAN WG1, No. e-Meeting, May 19, 2021-May 27, 2021, May 12, 2021 (May 12, 2021), XP052011349, 5 Pages, Section 3.

* cited by examiner

MCS 220-a  MCS 220-b

Delta Value 235  ACK/NACK 240

CHANNEL FEEDBACK FOR UPDATING MODULATION AND CODING SCHEME

FIELD OF TECHNOLOGY

The following relates to wireless communications, including channel feedback for updating modulation and coding scheme (MCS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support channel feedback for updating modulation and coding scheme (MCS). Generally, the described techniques provide for updating an MCS value according to a delta value provided to a base station in a feedback message from a user equipment (UE). In some examples, a base station may transmit a data message to a UE in a data block modulated according to an MCS. The UE may monitor for the data block and may attempt to decode the data block. If the UE successfully receives and decodes the data block, the UE may transmit an acknowledgment (ACK) in a feedback message. If the UE unsuccessfully receives or decodes the data block, the UE may transmit a negative acknowledgement (NACK). In some cases, the UE may transmit the feedback message with the ACK or NACK and a value from a codebook indicating for the base station to increase or decrease the MCS by a delta value for a following transmission or a retransmission.

A method for wireless communications at a UE is described. The method may include receiving, from a base station, a transmission including a data block modulated according to an MCS and transmitting, based on a result of a decoding process of the received transmission, a feedback message including a value selected from a codebook including a set of values, where the set of values includes a first subset of values indicating that the decoding process was successful and second subset of values indicating that the decoding process was unsuccessful, and where a first value of the first subset of values indicates an increase to the modulation and coding scheme of a first delta value and a second value of the second subset of values indicates a decrease to the MCS of a second delta value.

An apparatus for wireless communications at a UE is described. The apparatus may include a processor, memory coupled with the processor, and instructions stored in the memory. The instructions may be executable by the processor to cause the apparatus to receive, from a base station, a transmission including a data block modulated according to an MCS and transmit, based on a result of a decoding process of the received transmission, a feedback message including a value selected from a codebook including a set of values, where the set of values includes a first subset of values indicating that the decoding process was successful and second subset of values indicating that the decoding process was unsuccessful, and where a first value of the first subset of values indicates an increase to the modulation and coding scheme of a first delta value and a second value of the second subset of values indicates a decrease to the MCS of a second delta value.

Another apparatus for wireless communications at a UE is described. The apparatus may include means for receiving, from a base station, a transmission including a data block modulated according to an MCS and means for transmitting, based on a result of a decoding process of the received transmission, a feedback message including a value selected from a codebook including a set of values, where the set of values includes a first subset of values indicating that the decoding process was successful and second subset of values indicating that the decoding process was unsuccessful, and where a first value of the first subset of values indicates an increase to the modulation and coding scheme of a first delta value and a second value of the second subset of values indicates a decrease to the MCS of a second delta value.

A non-transitory computer-readable medium storing code for wireless communications at a UE is described. The code may include instructions executable by a processor to receive, from a base station, a transmission including a data block modulated according to an MCS and transmit, based on a result of a decoding process of the received transmission, a feedback message including a value selected from a codebook including a set of values, where the set of values includes a first subset of values indicating that the decoding process was successful and second subset of values indicating that the decoding process was unsuccessful, and where a first value of the first subset of values indicates an increase to the modulation and coding scheme of a first delta value and a second value of the second subset of values indicates a decrease to the MCS of a second delta value.

In some examples of the method, apparatuses, and non-transitory computer-readable medium described herein, a first quantity of the first subset of values may be different than a second quantity of the second subset of values.

Some examples of the method, apparatuses, and non-transitory computer-readable medium described herein may further include operations, features, means, or instructions for determining the set of values of the codebook based on the MCS.

In some examples of the method, apparatuses, and non-transitory computer-readable medium described herein, determining the set of values may include operations, features, means, or instructions for comparing the MCS to a threshold MCS.

In some examples of the method, apparatuses, and non-transitory computer-readable medium described herein, determining the set of values may include operations, features, means, or instructions for determining a first quantity of values in the first subset of values and a second quantity of values of the second subset of values based on the MCS.

Some examples of the method, apparatuses, and non-transitory computer-readable medium described herein may further include operations, features, means, or instructions for determining the first delta value or the second delta value based on the MCS.

Some examples of the method, apparatuses, and non-transitory computer-readable medium described herein may further include operations, features, means, or instructions for modifying at least one of the first delta value or the second delta value based on determining that a first spectral efficiency associated with the MCS may be within a threshold of a second spectral efficiency associated with an adjacent modulation order.

Some examples of the method, apparatuses, and non-transitory computer-readable medium described herein may further include operations, features, means, or instructions for receiving, from the base station and based on transmitting the feedback message including the value, a retransmission including the data block modulated according to an updated MCS.

Some examples of the method, apparatuses, and non-transitory computer-readable medium described herein may further include operations, features, means, or instructions for receiving, from the base station, radio resource control signaling configuring the codebook.

In some examples of the method, apparatuses, and non-transitory computer-readable medium described herein, a third value of the first subset of values indicates a decrease to the MCS.

A method for wireless communications at a base station is described. The method may include transmitting, to a UE, a transmission including a data block modulated according to an MCS and receiving, based on a result of a decoding process of the received transmission, a feedback message including a value selected from a codebook including a set of values, where the set of values includes a first subset of values of the set of values indicating that the decoding process was successful and second subset of values of the set of values indicating that the decoding process was unsuccessful, and where a first value of the first subset of values indicates an increase to the MCS of a first delta value and a second value of the second subset of values indicates a decrease to the MCS of a second delta value.

An apparatus for wireless communications at a base station is described. The apparatus may include a processor, memory coupled with the processor, and instructions stored in the memory. The instructions may be executable by the processor to cause the apparatus to transmit, to a UE, a transmission including a data block modulated according to an MCS and receive, based on a result of a decoding process of the received transmission, a feedback message including a value selected from a codebook including a set of values, where the set of values includes a first subset of values of the set of values indicating that the decoding process was successful and second subset of values of the set of values indicating that the decoding process was unsuccessful, and where a first value of the first subset of values indicates an increase to the MCS of a first delta value and a second value of the second subset of values indicates a decrease to the MCS of a second delta value.

Another apparatus for wireless communications at a base station is described. The apparatus may include means for transmitting, to a UE, a transmission including a data block modulated according to an MCS and means for receiving, based on a result of a decoding process of the received transmission, a feedback message including a value selected from a codebook including a set of values, where the set of values includes a first subset of values of the set of values indicating that the decoding process was successful and second subset of values of the set of values indicating that the decoding process was unsuccessful, and where a first value of the first subset of values indicates an increase to the MCS of a first delta value and a second value of the second subset of values indicates a decrease to the MCS of a second delta value.

A non-transitory computer-readable medium storing code for wireless communications at a base station is described. The code may include instructions executable by a processor to transmit, to a UE, a transmission including a data block modulated according to an MCS and receive, based on a result of a decoding process of the received transmission, a feedback message including a value selected from a codebook including a set of values, where the set of values includes a first subset of values of the set of values indicating that the decoding process was successful and second subset of values of the set of values indicating that the decoding process was unsuccessful, and where a first value of the first subset of values indicates an increase to the MCS of a first delta value and a second value of the second subset of values indicates a decrease to the MCS of a second delta value.

In some examples of the method, apparatuses, and non-transitory computer-readable medium described herein, a first quantity of the first subset of values may be different than a second quantity of the second subset of values.

Some examples of the method, apparatuses, and non-transitory computer-readable medium described herein may further include operations, features, means, or instructions for determining the set of values of the codebook based on the MCS.

In some examples of the method, apparatuses, and non-transitory computer-readable medium described herein, determining the set of values may include operations, features, means, or instructions for comparing the MCS to a threshold MCS.

In some examples of the method, apparatuses, and non-transitory computer-readable medium described herein, determining the set of values may include operations, features, means, or instructions for determining a first quantity of values in the first subset of values and a second quantity of values of the second subset of values based on the MCS.

Some examples of the method, apparatuses, and non-transitory computer-readable medium described herein may further include operations, features, means, or instructions for determining the first delta value or the second delta value based on the MCS.

Some examples of the method, apparatuses, and non-transitory computer-readable medium described herein may further include operations, features, means, or instructions for modifying at least one of the first delta value or the second delta value based on determining that a first spectral efficiency associated with the MCS may be within a threshold of a second spectral efficiency associated with an adjacent modulation order.

Some examples of the method, apparatuses, and non-transitory computer-readable medium described herein may further include operations, features, means, or instructions for updating the MCS according to the value in the feedback message and transmitting, to the UE, a retransmission including the data block modulated according to the updated MCS.

Some examples of the method, apparatuses, and non-transitory computer-readable medium described herein may further include operations, features, means, or instructions for transmitting, to the UE, radio resource control signaling configuring the codebook.

In some examples of the method, apparatuses, and non-transitory computer-readable medium described herein, a third value of the first subset of values indicates a decrease to the MCS.

DETAILED DESCRIPTION

In some wireless communications systems, a user equipment (UE) may communicate control signaling, data, or both, with a base station. For example, the base station may transmit a downlink grant to the UE that may schedule a downlink shared channel. The UE may transmit a message on an uplink control channel in response, the message including feedback for a downlink message and one or more measurements, such as channel state information (CSI) measurements. In some cases, the UE may transmit the CSI and feedback message in a same uplink resource. In some other cases, the UE may transmit the CSI and feedback message in separate uplink resources. In some examples, a base station may incorrectly schedule a modulation and coding scheme (MCS) and may use CSI to correct resulting behavior, which may result in inefficiencies due to additional reconfiguration signaling.

A UE may determine a difference in MCS (e.g., a delta MCS) to use for a retransmission from a base station and may feedback the delta MCS along with an acknowledgement (ACK) or negative acknowledgement (NACK) of the downlink shared channel transmission. The ACK/NACK and delta MCS may be fed back using a codebook which may include values for ACK with and without a delta MCS and NACK with and without a delta MCS, where the delta MCS may be different for ACK and NACK feedback. In some cases, the delta MCS value may depend on the current MCS value. For example, if the MCS value is close to a minimum or maximum (e.g., 0, 1, 27, or 28), the number of codepoints allocated to NACK or ACK may be modified. Additionally or alternatively, the delta MCS may be shifted up or down based on the MCS being at a switch point between modulation orders (e.g., where the spectral efficiency of the two points are similar). The base station may update the MCS value for subsequent transmissions or retransmissions based on the delta MCS value indicated by the UE.

Aspects of the disclosure are initially described in the context of wireless communications systems. Aspects of the disclosure are further described in the context of a process flow. Aspects of the disclosure are further illustrated by and described with reference to apparatus diagrams, system diagrams, and flowcharts that relate to updating a modulation and coding scheme in feedback.

Figure 1:
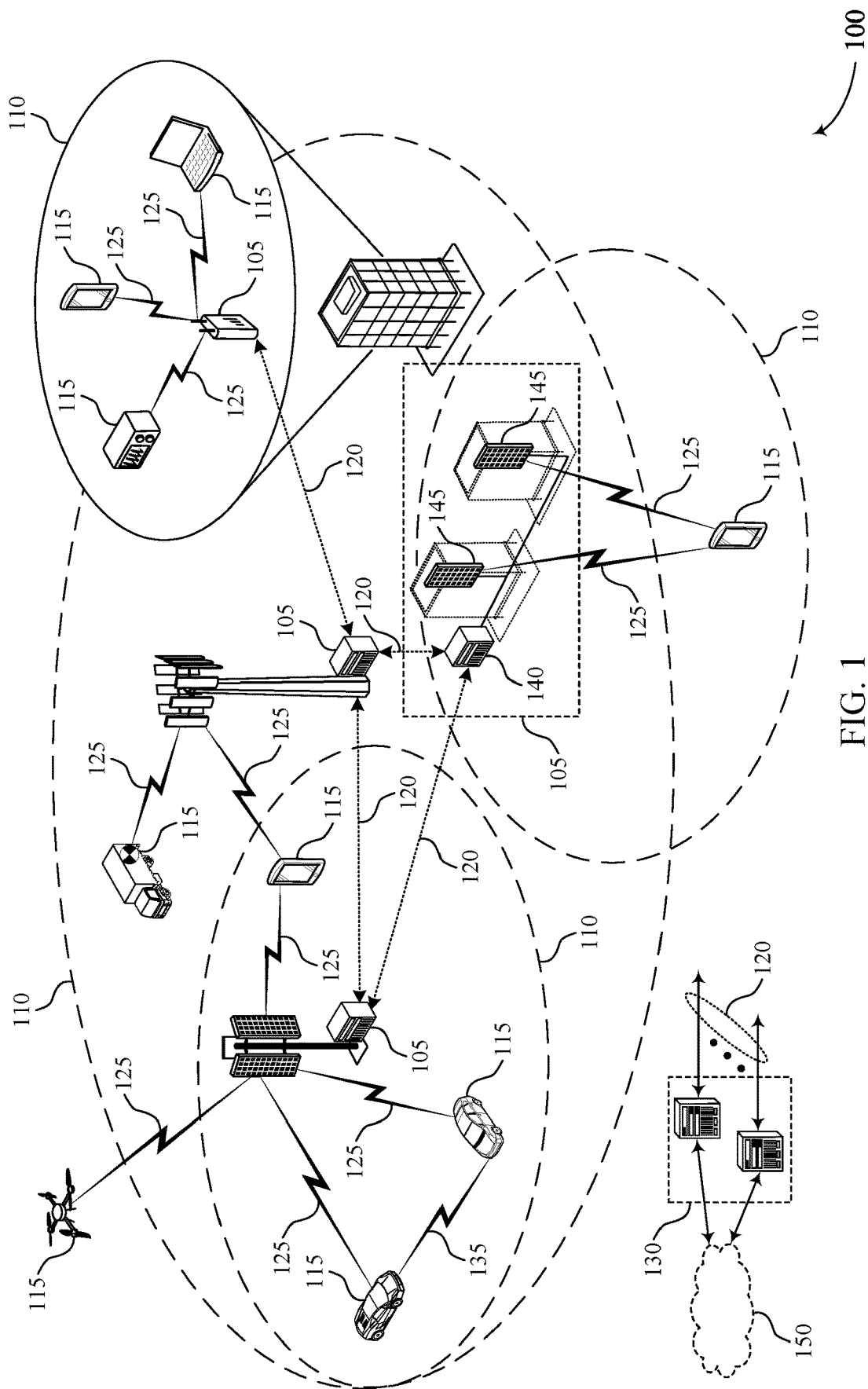
FIGS. 1 and 2 illustrate examples of wireless communications system that support channel feedback for updating modulation and coding scheme (MCS) in accordance with aspects of the present disclosure.

FIG. 1 illustrates an example of a wireless communications system 100 that supports channel feedback for updating MCS in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may receive a downlink grant from a base station 105. The downlink grant may schedule a data transmission in one or more data blocks according to an MCS. In some examples, the UE 115 may decode the data block and may transmit a feedback message to the base station 105. The feedback message may include an ACK or a NACK depending on whether the UE 115 received and decoded the data block successfully (e.g., an ACK) or unsuccessfully (e.g., a NACK). The UE 115 may receive the data block and may perform a decoding process according to the MCS. However, a base station 105 may not successfully or accurately schedule an MCS. For example, a scheduled MCS may represents a signal-to-noise ratio (SNR) higher than the actual SNR.

In some examples, a UE 115 may transmit a feedback message with a delta value for an MCS and an ACK/NACK. In some cases, the delta value may be a delta MCS value, which may be a change in MCS between an MCS used to receive a data block and an updated MCS value determined by the UE 115. The delta value may be different for an ACK than for a NACK. The delta value may be a function of the scheduling MCS, which may be the MCS value indicated to the UE 115 for a received data block. In some examples, a base station 105 may increase or decrease an MCS value based on the delta value for a feedback message including an ACK or a NACK. In some examples, for MCS values at a modulation format change, the delta value may be shifted.

Figure 2:
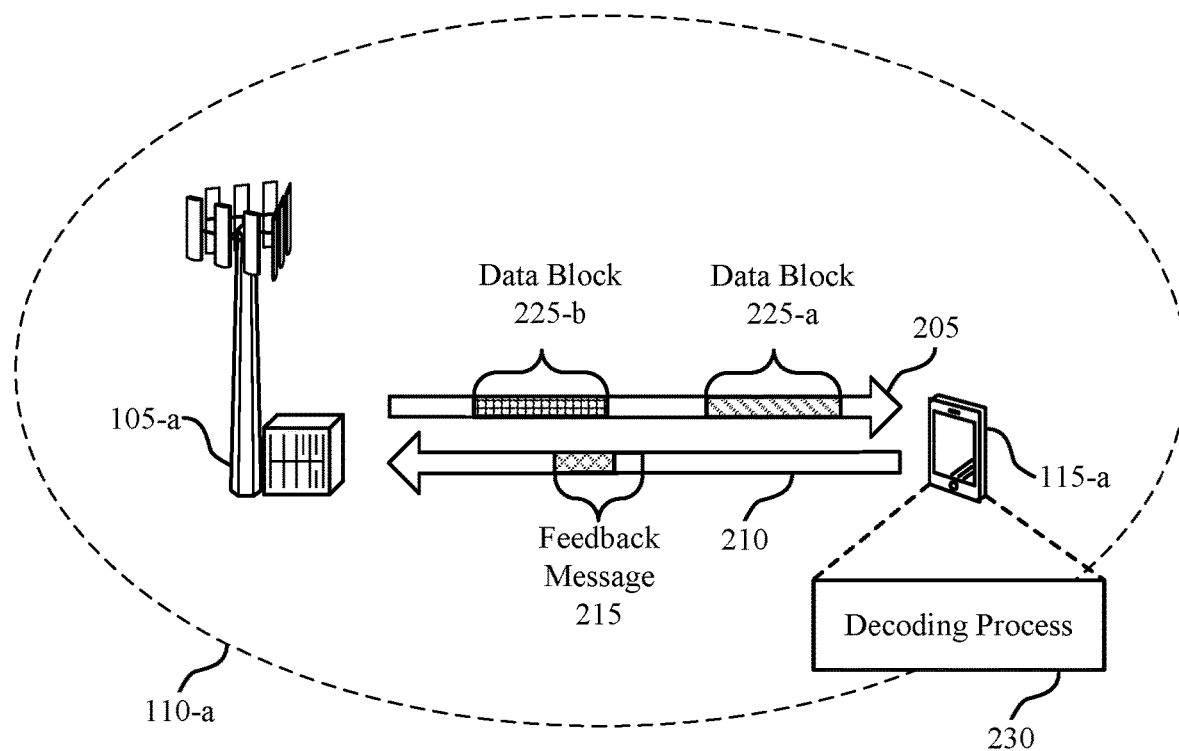
Figure 2:
Figure 2:
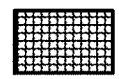
Figure 2:
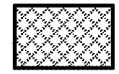

FIG. 2 illustrates an example of a wireless communications system 200 that supports updating an MCS in feedback in accordance with aspects of the present disclosure. In some examples, wireless communications system 200 may implement aspects of wireless communications system 100 and may include a UE 115-a and a base station 105-a with a coverage area 110-a, which may be examples of a UE 115 and a base station 105 with a coverage area 110 as described with reference to FIG. 1. In some examples, base station 105-a and UE 115-a may communicate control information, data, or both using a downlink communication link 205 and an uplink communication link 210. For example, base station 105-a may transmit one or more data messages to UE 115-a via a downlink communication link 205. UE 115-a may send a feedback message 215 to base station 105-a including an indication of an updated MCS 220 via an uplink communication link 210.

In some examples, a UE 115 may receive a downlink grant from a base station 105. For example, base station 105-a may transmit a downlink grant in control signaling (e.g., in a physical downlink control channel (PDCCH)) to UE 115-a via downlink communication link 205. The downlink grant may schedule a data transmission, such as a downlink shared channel transmission (e.g., a physical downlink shared channel (PDSCH) transmission). The base station 105 may transmit the data transmission in one or more data blocks 225, where each data block 225 is scheduled for time and frequency resources of the channel. For example, base station 105-a may transmit a data transmission or a portion of a data transmission to UE 115-a in data block 225-a, which may also be referred to as a transport block or a code block.

In some examples, the UE 115 may attempt to decode the data block 225 by performing a decoding operation and may transmit a feedback message 215 via an uplink communication link 210 in response to the data block 225. The feedback message may include an ACK or a NACK depending on whether the UE 115 received and decoded the data block 225 successfully (e.g., an ACK) or unsuccessfully (e.g., a NACK). In some cases, UE 115-a may transmit a feedback message 215 in an uplink control channel, such as a physical uplink control channel (PUCCH) in response to a data block 225 from base station 105-b. Additionally or alternatively, the UE 115 may perform one or more CSI measurements based on decoding a downlink shared channel (e.g., a PDSCH carrying a data block 225), based on a CSI-reference signal (CSI-RS), or both. In some examples, the UE 115 may send the CSI measurements back to the network (e.g., to a base station 105) via a periodic CSI report in a PUCCH, a semi-persistent CSI report in a PUCCH or a physical uplink shared channel (PUSCH), an aperiodic CSI report in a PUSCH (e.g., triggered by an uplink grant), or the like. Additionally or alternatively, the UE 115 may send the CSI measurements in an aperiodic CSI report in a PUCCH, which may be triggered by a downlink grant (e.g., unicast or group common-DCI (GC-DCI)) for the data block 225.

In some examples, the CSI report may include channel measurements, interference measurements (e.g., interference characteristics), a channel quality indicator (CQI) (e.g., wideband and subband CQI), PDCCH or PDSCH decoding information, a HARQ redundancy version (RV) sequence, or additional measurements. The CSI report may improve link adaptation of retransmissions or new transmissions at a scheduler of the base station 105. In some cases, the UE 115 may transmit the CSI measurements in a CSI report together with the feedback message 215 in the PUCCH (e.g., in a same time and frequency resource in the PUCCH). In some other cases, the UE 115 may transmit the CSI report separate of the feedback message 215 in a PUCCH (e.g., in separate time and frequency resource in the PUCCH).

In some cases, the base station 105 may encode the data block 225 prior to transmission. For example, the base station 105 may perform an encoding process including applying an MCS to the data block 225 prior to transmission. The MCS may define a number of useful bits carried by one symbol (e.g., a resource element), which may depend on signal quality in a wireless link (e.g., downlink communication link 205). In some examples, as the signal quality increases, the MCS may increase as well. If the signal quality for a wireless link is relatively high, each resource may carry more information for the data transmission. Thus, the MCS may depend on a block error rate (BLER), which may be defined as a ratio of a number of erroneous blocks received to a total number of blocks sent. An erroneous block may be a block in which the decoding (e.g., for an initial RV) is unsuccessful. In some cases, the base station 105 may attempt to maintain a BLER when selecting an MCS. For example, the base station 105 may use a threshold BLER to determine an MCS for a data block 225, and may signal an indication of the MCS to the UE 115 in control signaling, such as a downlink control information (DCI) message (e.g., with the downlink grant).

The base station 105 may use the MCS to determine a modulation order defining how many bits may be carried by a resource element (e.g., according to a quadrature phase shift keying (QPSK) or quadrature amplitude modulation (QAM) scheme) and a code rate defining a ratio between useful bits and total transmitted bits (e.g., including redundancy bits). In some examples, there may be a number of different MCS values the base station 105 may select from an MCS index table. For example, the base station 105 may select an MCS based on an MCS index between 0 and 31, and may indicate the MCS index to the UE 115. Further, the base station 105 may perform an outer loop link adaptation (OLLA) process to adaptively adjust an average BLER to a target value (e.g., for subsequent data transmissions).

In some examples, the UE 115 may receive a data block 225 from the base station 105 based on an indication of the MCS (e.g., the MCS index) and the downlink grant. For example, UE 115-a may receive a downlink grant and an indication of an MCS used by base station 105-a prior to receiving data block 225-a. At 230, UE 115-a may receive data block 225-a and perform a decoding process according to the MCS indicated by base station 105-a. However, a base station 105 may not successfully or accurately schedule an MCS. For example, a scheduled MCS may represents an SNR higher than the actual SNR (e.g., 10 dB higher).

In some cases, the base station 105 may use a CSI report to perform OLLA (e.g., correct outer loop link behavior). Additionally or alternatively, the base station 105 may use the CSI report for PDSCH transmission parameter reconfiguration (e.g., to improve reliability of a new transmission and retransmissions). In some examples, if the UE 115 transmits the CSI report together with the feedback message 215, which may be referred to as HARQ CSI feedback. In some cases, the CSI report may be based on downlink channel decoding (e.g., PDCCH decoding, PDSCH decoding, or both). In some cases, the UE 115 may report a PDSCH decoding margin based on a number of decoder iterations, a number of flipped bits before and after decoding, or both. In some other cases, the UE 115 may report a BLER probability based on mapping an absolute value of log likelihood ratios (LLRs) to a bit error rate. In some other cases, the UE 115 may report a delta CQI, a delta MCS, a delta SINR, or a combination thereof.

For example, UE 115-a may transmit a CSI report and a feedback message 215 with a delta value 235 and an ACK/NACK 240. The ACK/NACK 240 and delta value 235 may be jointly coded (e.g., coded in single field in the feedback message 215). In some cases, the delta value 235 may be a delta MCS value, which may be a change in MCS between an MCS used to receive a data block 225, such as data block 225-a, and an updated MCS value determined by UE 115-a. In some cases, UE 115-a may transmit a delta value 235 to base station 105-a based on the decoding process at 230. For example, if UE 115-a successfully decodes and receives a data block 225, the feedback message 215 may include an ACK. Alternatively, if UE 115-a unsuccessfully decodes or fails to receive the data block 225, the feedback message 215 may include a NACK. The delta value 235 may be different for an ACK than for a NACK (e.g., may have a different magnitude). The delta value 235 may be a function of the scheduling MCS, which may be the MCS value indicated to the UE 115 for a received data block 225. As an example, if the feedback message 215 includes a NACK, UE 115-a may keep the same MCS value or decrease the MCS value. Thus, the reported MCS after applying the delta value 235 may be lower than a current MCS.

In some examples, a UE 115 may decide between one or more hypotheses when transmitting a feedback message 215 that includes an ACK/NACK 240 and a delta value 235 (e.g., X). For example, the UE 115 may transmit an ACK and indication of the MCS value plus the delta value 235 for the next scheduling (e.g., ACK and MCS+X), an ACK with a same MCS for the next scheduling, a NACK and indication of a same MCS for a retransmission, or a NACK and indication of an MCS value minus the delta value 235 for the retransmission (e.g., MCS−X). In some cases, the delta value 235, may be different for an ACK and a NACK. Thus, a UE 115 may include different values of X, such as $X_N$ for a NACK and $X_A$ for an ACK, according to the hypothesis, since an SNR of an outerloop may drift to more positive than negative, or vice versa. In some examples, $X_N$ and $X_A$ may be RRC configured by base station 105-a.

In some cases, a UE 115, such as UE 115-a, may use unequal MCS quantization levels or MCS delta values, such as a delta value 235, for an ACK and a NACK. For example, UE 115-a may include a delta value 235 for a delta MCS that may be a function of the MCS. For example, at edge values of MCS in an MCS table, which may range from an MCS value of 0 to an MCS value of 27 or 28, or relatively large MCS values, the UE 115 may leverage one or more bits to provide a detailed delta value 235. In some examples, if the MCS value is less than $|x_n|$, $|X_A|$, or both, UE 115-a may use additional available points or may perform a different mapping of values. For example, there may be an additional ACK or NACK point with multiple different possibilities (e.g., $X_{N1}$, $X_{N2}$, $X_{A1}$, or $X_{A2}$ rather than a single possibility, $X_N$ or $X_A$).

In some examples, UE 115-a may transmit the feedback message 215 using more than one bit, such as two bits or three bits (e.g., depending on UE capability). For example, the feedback message 215 may include a 2 bit value indicating the ACK/NACK 240 and a delta value 235 level, which may depend on the type of feedback (e.g., an ACK or a NACK), which is shown in Table 2.

TABLE 1

| Bit Value | Carried Information | |
|---|---|---|
| | Feedback Type | Level |
| 00 | NACK | 1 |
| 01 | NACK | 2 |
| 10 | ACK | 1 |
| 11 | ACK | 2 |

In some examples, for an ACK case, if a difference in a scheduled MCS value and a measured MCS BLER is less than or equal to a quantization level (e.g., an RRC or MAC-CE quantization level), $X_0^A$, then the UE 115 may report a Level 1 delta value 235. UE 115-a may indicate the Level 1 delta value 235 and the ACK using a bit value of 00. If the difference in scheduled MCS value and the measured MCS BLER is greater than $X_0^A$, then the UE 115 may report a Level 2 delta value 235. UE 115-a may indicate the Level 2 delta value 235 and the ACK using a bit value of 01.

In some other examples, for a NACK case, if a difference in a scheduled MCS value and a measured MCS BLER is less than or equal to a quantization level (e.g., an RRC or MAC-CE quantization level), $X_0^N$, then the UE 115 may report a Level 1 delta value 235. UE 115-a may indicate the Level 1 delta value 235 and the NACK using a bit value of 10. If the difference in scheduled MCS value and the measured MCS BLER is greater than $X_0^N$, then the UE 115 may report a Level 2 delta value 235. UE 115-a may indicate the Level 2 delta value 235 and the NACK using a bit value of 11. In some cases, the Level 2 delta value 235 for a NACK may be different than the Level 2 delta value for an ACK. For example, a delta value 235 for an ACK may be 1 while a delta value 235 for a NACK may be 2. In some examples, a base station 105 or network may program or otherwise configure the delta values 235 at a UE 115.

Similarly, if UE 115-a transmits a 3 bit feedback message, UE 115-a may include an ACK/NACK 240 and a delta value 235 with a different outcome for a NACK (e.g., 8 possibilities). That is, a delta value 235 may be different for an ACK than for a delta value 235 for a NACK. Additionally or alternatively, a codebook for communications between UE 115-a and base station 105-a may have more points for a NACK than an ACK. The feedback message 215 may include a 3 bit value indicating the ACK/NACK 240 and a delta value 235 level, which may depend on the type of feedback (e.g., an ACK or a NACK), which is shown in Table 1.

TABLE 2

| Bit Value | Carried Information | |
|---|---|---|
| | Feedback Type | Level |
| 000 | NACK | 1 |
| 001 | NACK | 2 |
| 010 | NACK | 3 |
| 011 | NACK | 4 |
| 100 | ACK | 1 |
| 101 | ACK | 2 |
| 110 | ACK | 3 |
| 111 | NACK | 5 |

In some examples, for an ACK case, if a difference in a scheduled MCS value and a measured MCS BLER is less than or equal to a quantization level (e.g., an RRC or MAC-CE quantization level), $X_0^A$, then the UE 115 may report a Level 1 delta value 235, where the Level 1 delta value 235 may represent a zero MCS adjustment. UE 115-a may indicate the Level 1 delta value 235 and the ACK using a bit value of 100. If the difference in scheduled MCS value and the measured MCS BLER is greater than $X_0^A$ but less than or equal to the next quantization level, $X_1^A$, then the UE 115 may report a Level 2 delta value 235, which may be greater than zero. UE 115-a may indicate the Level 2 delta value 235 and the ACK using a bit value of 101. If the difference in scheduled MCS value and the measured MCS BLER is greater than $X_1^A$, then the UE 115 may report a Level 3 delta value 235. UE 115-a may indicate the Level 3 delta value 235 and the ACK using a bit value of 110. Alternatively, one or more of the delta values 235 associated with the ACK may indicate to decrease the MCS (e.g., may be a negative delta value).

In some examples, for a NACK case, there may be additional delta values 235 when compared with the ACK case (e.g., 5 NACK points and 3 ACK points, 6 NACK points and 2 NACK points, or the like). For example, if a difference in a scheduled MCS value and a measured MCS BLER is less than or equal to a quantization level (e.g., an RRC or MAC-CE quantization level), $X_0^N$, then the UE 115 may report a Level 1 delta value 235, where the Level 1 delta value 235 may represent a zero MCS adjustment. UE 115-a may indicate the Level 1 delta value 235 and the NACK using a bit value of 000. If the difference in scheduled MCS value and the measured MCS BLER is greater than $X_0^N$ but less than or equal to the next quantization level, $X_1^N$, then the UE 115 may report a Level 2 delta value 235. UE 115-a may indicate the Level 2 delta value 235 and the NACK using a bit value of 001. If the difference in scheduled MCS value and the measured MCS BLER is greater than $X_1^N$ but less than or equal to the next quantization level, $X_2^N$, then the UE 115 may report a Level 3 delta value 235. UE 115-a may indicate the Level 3 delta value 235 and the NACK using a bit value of 010. If the difference in scheduled MCS value and the measured MCS BLER is greater than $X_2^N$ but less than or equal to the next quantization level, $X_3^N$, then the UE 115 may report a Level 4 delta value 235. UE 115-a may indicate the Level 4 delta value 235 and the NACK using a bit value of 011. If the difference in scheduled MCS value and the measured MCS BLER is greater than $X_3^N$, then the UE 115 may report a Level 5 delta value 235. UE 115-a may indicate the Level 5 delta value 235 and the NACK using a bit value of 111. Thus, there may be more codepoints added for a NACK than for an ACK.

In some examples, UE 115-a may increase or decrease an MCS value based on the delta value 235 for a feedback message 215 including an ACK. For example, if an OLLA has an MCS 220 drifting to a bigger value than a current MCS value, then UE 115-a may include a decreased delta value 235. Thus, base station 105-a may use a smaller MCS value for a next transmission. For example, if an initial transmission has an MCS value of MCS20 and UE 115-a transmits an ACK with a decreased delta value 235 due to poor LLR quality, then base station 105-a may use an MCS value of MCS18.

In some cases, the delta value 235 may be a function of a scheduled MCS 220. For example, the delta value 235 may be a function of MCS 220-a for a scheduled transmission of data block 225-a. The network may use additional codepoints for a NACK or an ACK for one or more MCS values (e.g., MCS0, MCS27, or MCS28). For example, the network may use 3 NACK codepoints and 1 ACK codepoint rather than 2 NACK codepoints and 2 ACK codepoints. In some cases, the number of additional codepoints for NACK may be different close to MCS values at the boundaries of an MCS table. For example, for the three bit feedback value, the UE 115 may have 5 NACK codepoints and 3 ACK codepoints at MCS2, 6 NACK codepoints and 2 ACK codepoints at MCS1, and 7 NACK codepoints and 1 ACK codepoint at MCS0. Additionally or alternatively, for a modulation order switch point, where spectral efficiency of two points may be almost the same, the delta value 235 may shift by 1 point (e.g., up or down based on decoding outcome). In some cases, UE 115-*a* may determine to transmit an ACK using an MCS value plus a delta value 235, X1, for the next scheduling, an ACK using a same MCS 220 for the next scheduling, a NACK using a same MCS for a retransmission, or an ACK using an MCS value plus a delta value 235, X2. The values of X1 and X2 may depend on the MCS value (e.g., MCS 220-*a*).

In some cases, such as at MCS0, the UE 115 may not report an MCS value of MCS0 or a delta value 235 (e.g., MCS0-|Delta value 235|) for an ACK, a NACK, or both. For an MCS value less than a threshold MCS value (e.g., for MCS0, MCS1, . . . , MCSx (for MCSx<X)), the delta value 235 UE 115-*a* uses may be based on the threshold MCS value. For example, if UE 115-*a* determines the MSC value is below the threshold MCS value, MCSx, UE 115-*a* may report MCS0 (e.g., since MCSx-X is less than MCS0). In some other examples, if UE 115-*a* determines the MCS value is above MCSx, UE 115-*a* may report a delta value 235 for an MCS value that is equal to or greater than MCSx. In some examples, for MCS values less than a delta value (e.g., for MCSx where MCSx<X), UE 115-*a* may determine the delta value 235 as a function of the scheduled MCS 220. Further, UE 115-*a* may determine when a new ACK point or NACK point may be added. In some cases, the new delta values 235 (e.g., X1 and X2) may depend on the MCS value being below or exceeding a threshold.

In some examples, for MCS values around a modulation format change, the delta value 235 may change. If two MCS values have a similar spectral efficiency and operating SNR, the delta value 235 may be shifted. In some cases, each delta value 235, except for 0, may be shifted. For example, an MCS value of 9, MCS9, and an MCS value of 10, MCS10, may have similar spectral efficiency and operating SNR. When base station 105-*a* schedules MCS 9, the delta value 235 reported by UE 115-*a* may have an increase in magnitude of 1 for an ACK (e.g., if the delta value is X for an ACK for other MCS values, the delta value may be X+1 for MCS9). Similarly, if base station 105-*a* schedules MCS10, then the delta value 235 reported by UE 115-*a* may have a magnitude increase of 1 for a NACK (e.g., if the delta value is –X for a NACK for other MCS values, the delta value may be –(X+1) for MCS10). In some cases, the delta value 235 reported may equal X for other MCS values (e.g., not at boundaries of modulation orders). In some cases, a shift may be applied prior to applying the delta (e.g., and may be applied even for a delta value of 0). Thus, if base station 105-*a* schedules MCS9, then since MCS9 and MCS10 have similar spectral efficiency, UE 115-*a* may increment the MCS (e.g., move MCS9 to MCS10) for an ACK (e.g., because an ACK may mean UE 115-*a* may use a higher MCS). If base station 105-*a* schedules MCS10, then since MCS9 and MCS10 have similar spectral efficiency, UE 115-*a* may decrement the MCS (e.g., move MCS10 to MCS9) for a NACK (e.g., because a NACK may mean UE 115-*a* may use a lower MCS). After moving the MCS value, UE 115-*a* may apply the delta value X for the ACK or NACK, which may in some cases be a delta value equal to 0.

Similarly, for higher MCS values, such as MCS28, there may be no way for UE 115-*a* to report MCS28+|Delta value 235| for an ACK, a NACK, or both. In some cases, an extra NACK point or ACK point may be added to the codebook. For example with two bits for the codebook value, UE 115-*a* may use a same MCS value for a next scheduling for an ACK, while for a NACK UE 115-*a* may use a same MCS value for a retransmission, an MCS value minus a delta value 235, X1, or an MCS value minus a delta value 235, X2. In some examples, X1 and X2 may be RRC configured and may change based on MCS 220. X1 and X2 may each be different from X, where X may be defined in RRC signaling and may be used for other MCS points that are not near an edge of a table of MCS values. In example using a three bits for the codebook value, the codebook may have 5 NACK codepoints and 3 ACK codepoints, 6 NACK codepoints and 2 ACK codepoints, or 7 NACK codepoints and 1 ACK codepoint.

Figure 3:
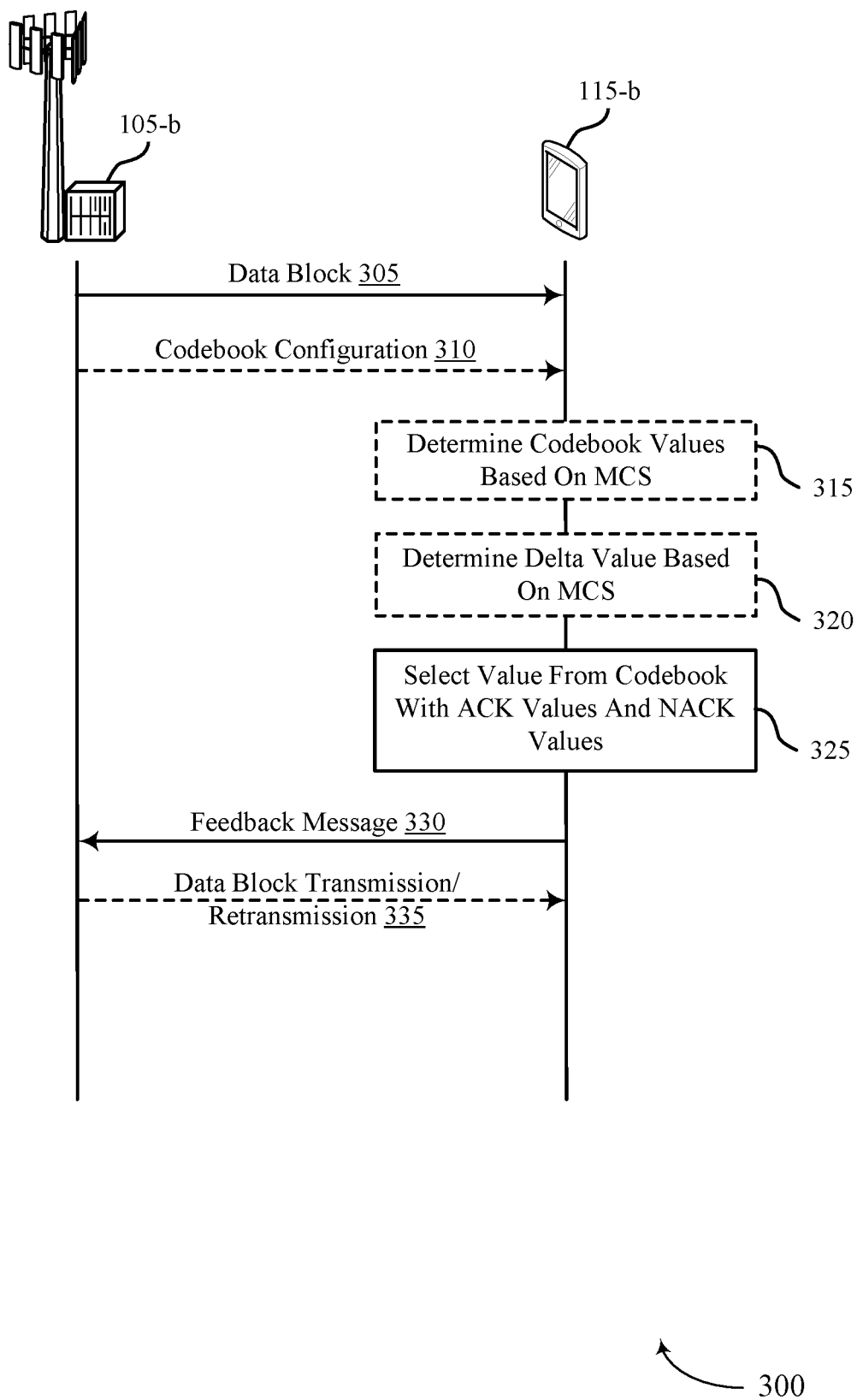
FIG. 3 illustrates an example of a process flow that supports channel feedback for updating MCS in accordance with aspects of the present disclosure.

FIG. 3 illustrates an example of a process flow 300 that supports channel feedback for updating MCS in accordance with aspects of the present disclosure. In some examples, process flow 300 may implement aspects of wireless communications system 100 and wireless communications system 200. The process flow 300 may illustrate an example of a UE 115-*b* transmitting a delta value for an updated MCS to a base station 105-*b* in a feedback message with an ACK or a NACK. Alternative examples of the following may be implemented, where some processes are performed in a different order than described or are not performed. In some cases, processes may include additional features not mentioned below, or further processes may be added.

At 305, base station 105-*b* may transmit a data transmission to a UE 115-*b* using a data block, which may include encoded data mapped to a set of time and frequency resources. The data block may be an example of a transport block, a code block, or the like. In some examples, base station 105-*b* may perform an encoding operation on the data transmission prior to transmitting the data block. During the encoding operation, base station 105-*b* may modulate the data block according to an MCS.

At 310, base station 105-*b* may transmit a codebook configuration to UE 115-*b* configuring a set of values of the codebook. UE 115-*b* may receive RRC signaling configuring the codebook. In some examples, the set of values includes a subset of values for an ACK message (e.g., indicating that the decoding process was successful) and another subset of values for a NACK message (e.g., indicating that the decoding process was unsuccessful). Each value in the codebook may indicate a delta value to increase or decrease the MCS associated with a value of the codebook. For example, the subset of values for the ACK message may include delta values that increase the MCS or decrease the MCS. In some other examples, the subset of values for the NACK message may include delta values that decrease the MCS. In some examples, a quantity of the ACK values in the codebook may be different than a quantity of NACK values.

At 315, UE 115-*b* may determine the set of values of the codebook based on the MCS. For example, UE 115-*b* may compare the MCS to a threshold MCS to determine the set of values. Additionally or alternatively, UE 115-*b* may determine a quantity of values in the subset of ACK values and another quantity of values in the subset of NACK values based on the MCS. That is, the ACK values and the NACK values in the codebook may depend on the MCS.

At 320, UE 115-*b* may determine a delta value for the ACK or the NACK based on the MCS.

At 325, UE 115-*b* may select a value from the codebook. For example, if UE 115-*b* successfully receives and decodes the data block, UE 115-*b* may choose an ACK value from the codebook for increasing or decreasing the MCS by a delta value. In some other examples, if UE 115-*b* unsuccessfully receives or decodes the data block, UE 115-*b* may choose a NACK value from the codebook for decreasing the MCS by a delta value.

At 330, UE 115-*b* may transmit a feedback message to base station 105-*b* including an ACK or a NACK value selected from the codebook. In some examples, UE 115-*b* may modify the delta value for the ACK or the NACK value in the codebook based on determining that a spectral efficiency of the MCS is within a threshold of another spectral efficiency of an adjacent modulation order.

At 335, UE 115-*b* may receive a retransmission including the data block or a transmission including a new data block modulated according to an updated MCS.

Figure 4:
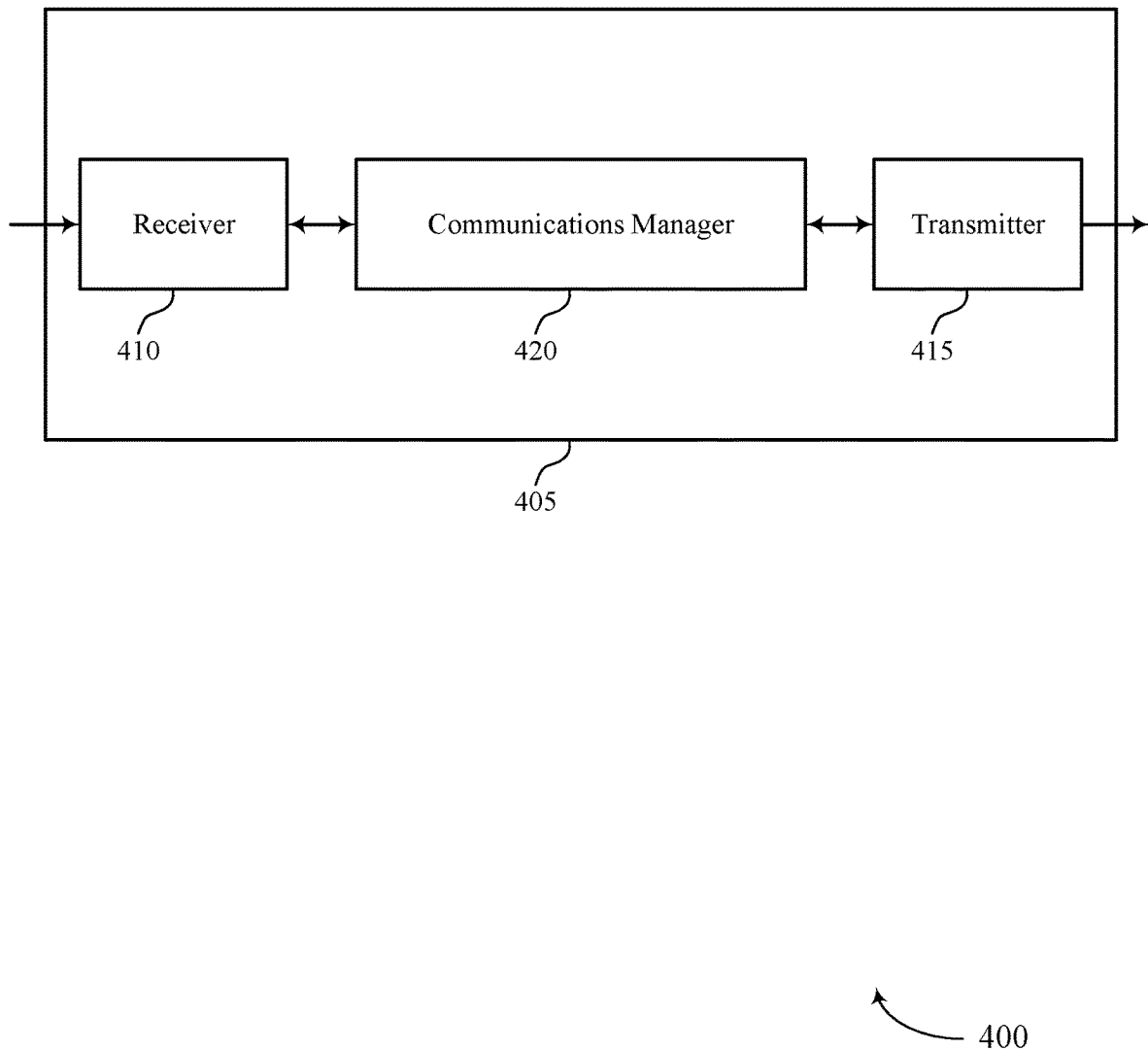
FIGS. 4 and 5 show block diagrams of devices that support channel feedback for updating MCS in accordance with aspects of the present disclosure.

FIG. 4 shows a block diagram 400 of a device 405 that supports updating an MCS in feedback in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to updating an MCS in feedback). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to updating an MCS in feedback). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of updating an MCS in feedback as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving, from a base station, a transmission including a data block modulated according to an MCS. The communications manager 420 may be configured as or otherwise support a means for transmitting, based on a result of a decoding process of the received transmission, a feedback message including a value selected from a codebook including a set of values, where the set of values includes a first subset of values indicating that the decoding process was successful and second subset of values indicating that the decoding process was unsuccessful, and where a first value of the first subset of values indicates an increase to the modulation and coding scheme of a first delta value and a second value of the second subset of values indicates a decrease to the MCS of a second delta value.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for a UE 115 to transmit a value from a codebook indicating a delta value for an updated MCS in a feedback message to a base station 105, which may cause reduced processing, reduced power consumption, more efficient utilization of communication resources, and the like.

Figure 5:
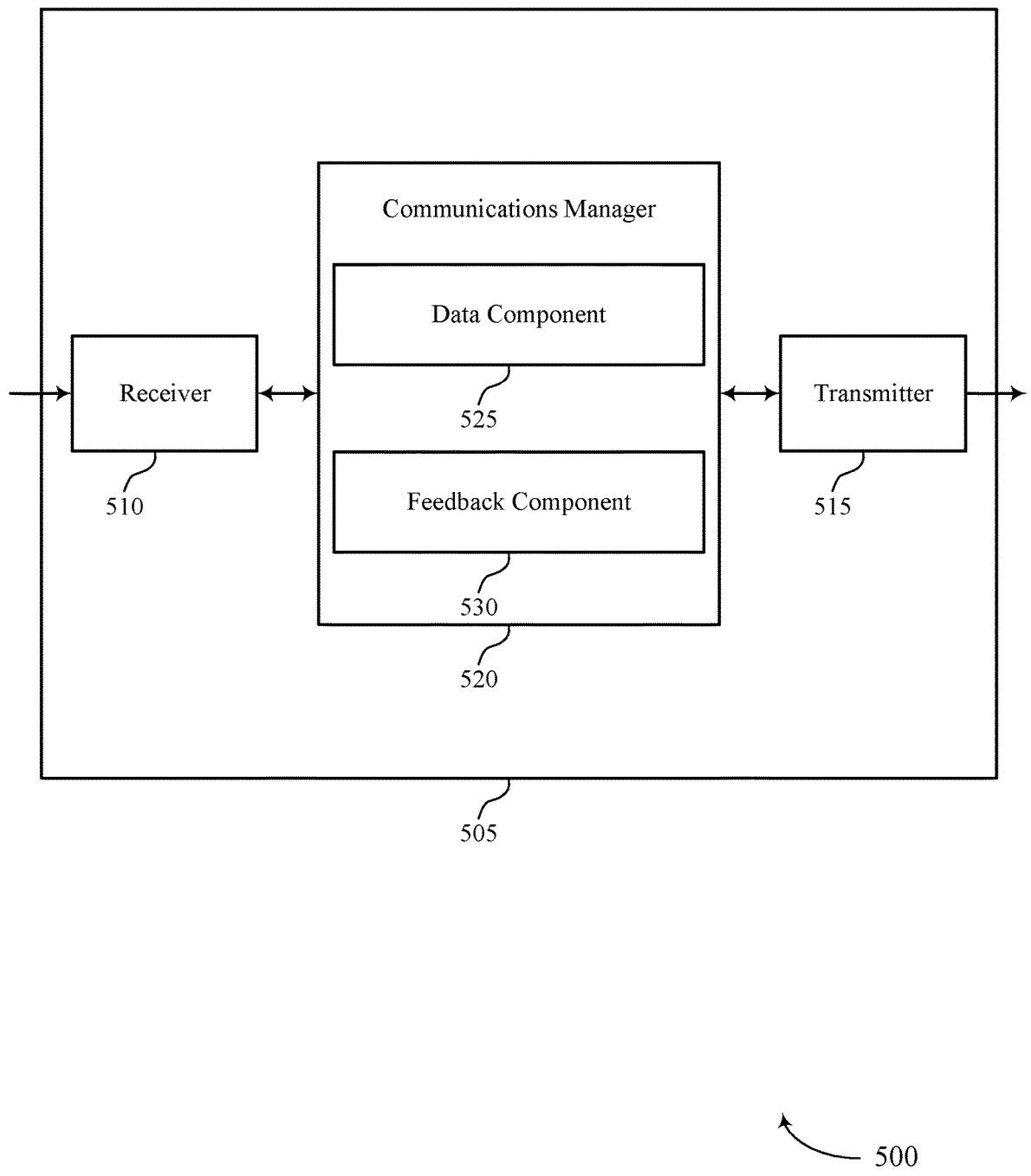

FIG. 5 shows a block diagram 500 of a device 505 that supports channel feedback for updating MCS in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to updating an MCS in feedback). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to updating an MCS in feedback). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of updating an MCS in feedback as described herein. For example, the communications manager 520 may include a data component 525 a feedback component 530, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The data component 525 may be configured as or otherwise support a means for receiving, from a base station, a transmission including a data block modulated according to an MCS. The feedback component 530 may be configured as or otherwise support a means for transmitting, based on a result of a decoding process of the received transmission, a feedback message including a value selected from a codebook including a set of values, where the set of values includes a first subset of values indicating that the decoding process was successful and second subset of values indicating that the decoding process was unsuccessful, and where a first value of the first subset of values indicates an increase to the modulation and coding scheme of a first delta value and a second value of the second subset of values indicates a decrease to the MCS of a second delta value.

Figure 6:
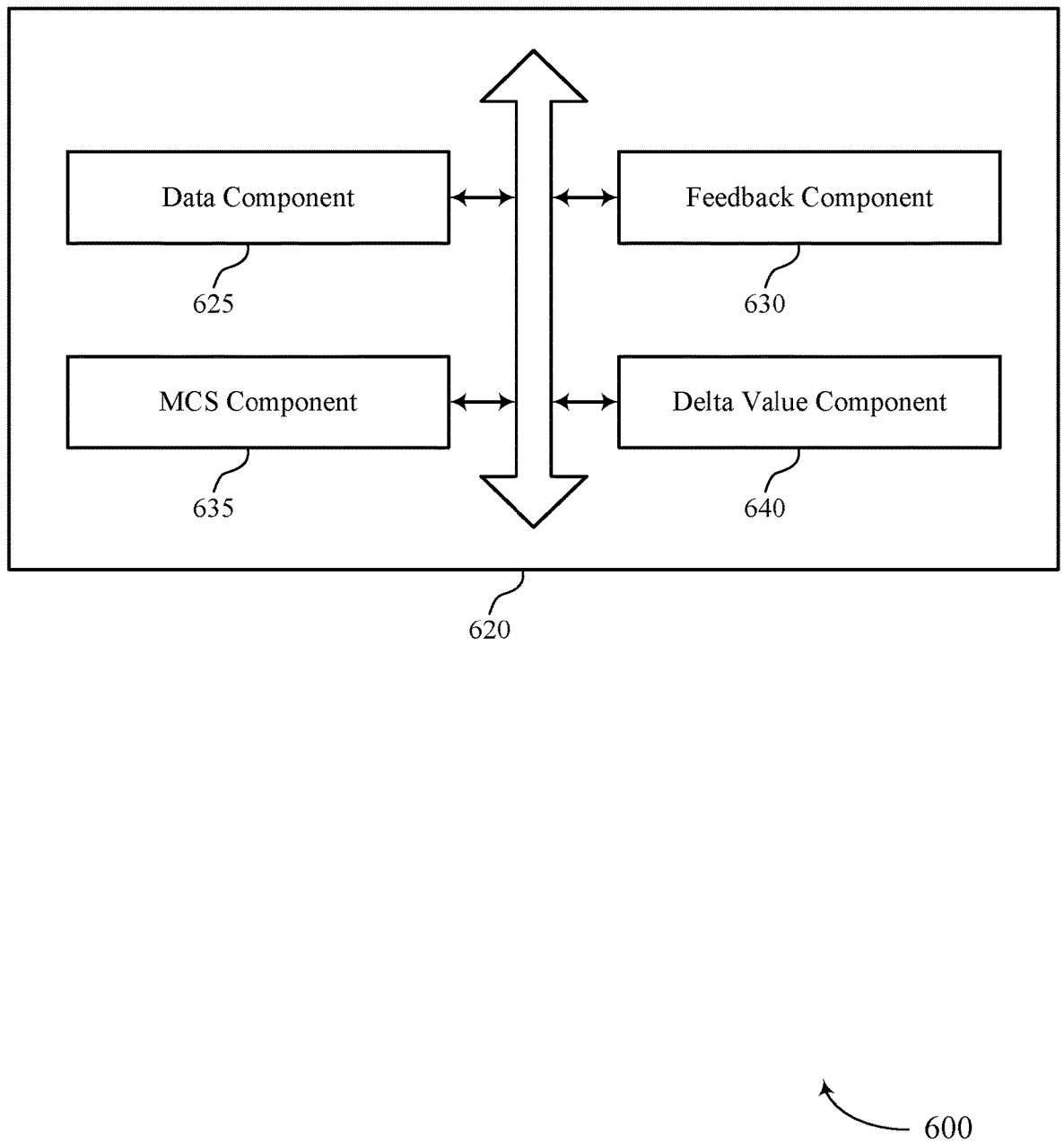
FIG. 6 shows a block diagram of a communications manager that supports channel feedback for updating MCS in accordance with aspects of the present disclosure.

FIG. 6 shows a block diagram 600 of a communications manager 620 that supports channel feedback for updating MCS in accordance with aspects of the present disclosure. The communications manager 620 may be an example of aspects of a communications manager 420, a communications manager 520, or both, as described herein. The communications manager 620, or various components thereof, may be an example of means for performing various aspects of updating an MCS in feedback as described herein. For example, the communications manager 620 may include a data component 625, a feedback component 630, an MCS component 635, a delta value component 640, or any combination thereof. Each of these components may communicate, directly or indirectly, with one another (e.g., via one or more buses).

The communications manager 620 may support wireless communications at a UE in accordance with examples as disclosed herein. The data component 625 may be configured as or otherwise support a means for receiving, from a base station, a transmission including a data block modulated according to an MCS. The feedback component 630 may be configured as or otherwise support a means for transmitting, based on a result of a decoding process of the received transmission, a feedback message including a value selected from a codebook including a set of values, where the set of values includes a first subset of values indicating that the decoding process was successful and second subset of values indicating that the decoding process was unsuccessful, and where a first value of the first subset of values indicates an increase to the modulation and coding scheme of a first delta value and a second value of the second subset of values indicates a decrease to the MCS of a second delta value.

In some examples, a first quantity of the first subset of values is different than a second quantity of the second subset of values.

In some examples, the MCS component 635 may be configured as or otherwise support a means for determining the set of values of the codebook based on the MCS.

In some examples, to support determining the set of values, the MCS component 635 may be configured as or otherwise support a means for comparing the MCS to a threshold MCS.

In some examples, to support determining the set of values, the MCS component 635 may be configured as or otherwise support a means for determining a first quantity of values in the first subset of values and a second quantity of values of the second subset of values based on the MCS.

In some examples, the delta value component 640 may be configured as or otherwise support a means for determining the first delta value or the second delta value based on the MCS.

In some examples, the data component 625 may be configured as or otherwise support a means for modifying at least one of the first delta value or the second delta value based on determining that a first spectral efficiency associated with the MCS is within a threshold of a second spectral efficiency associated with an adjacent modulation order.

In some examples, the feedback component 630 may be configured as or otherwise support a means for receiving, from the base station and based on transmitting the feedback message including the value, a retransmission including the data block modulated according to an updated MCS.

In some examples, the MCS component 635 may be configured as or otherwise support a means for receiving, from the base station, RRC signaling configuring the codebook.

In some examples, a third value of the first subset of values indicates a decrease to the MCS.

Figure 7:
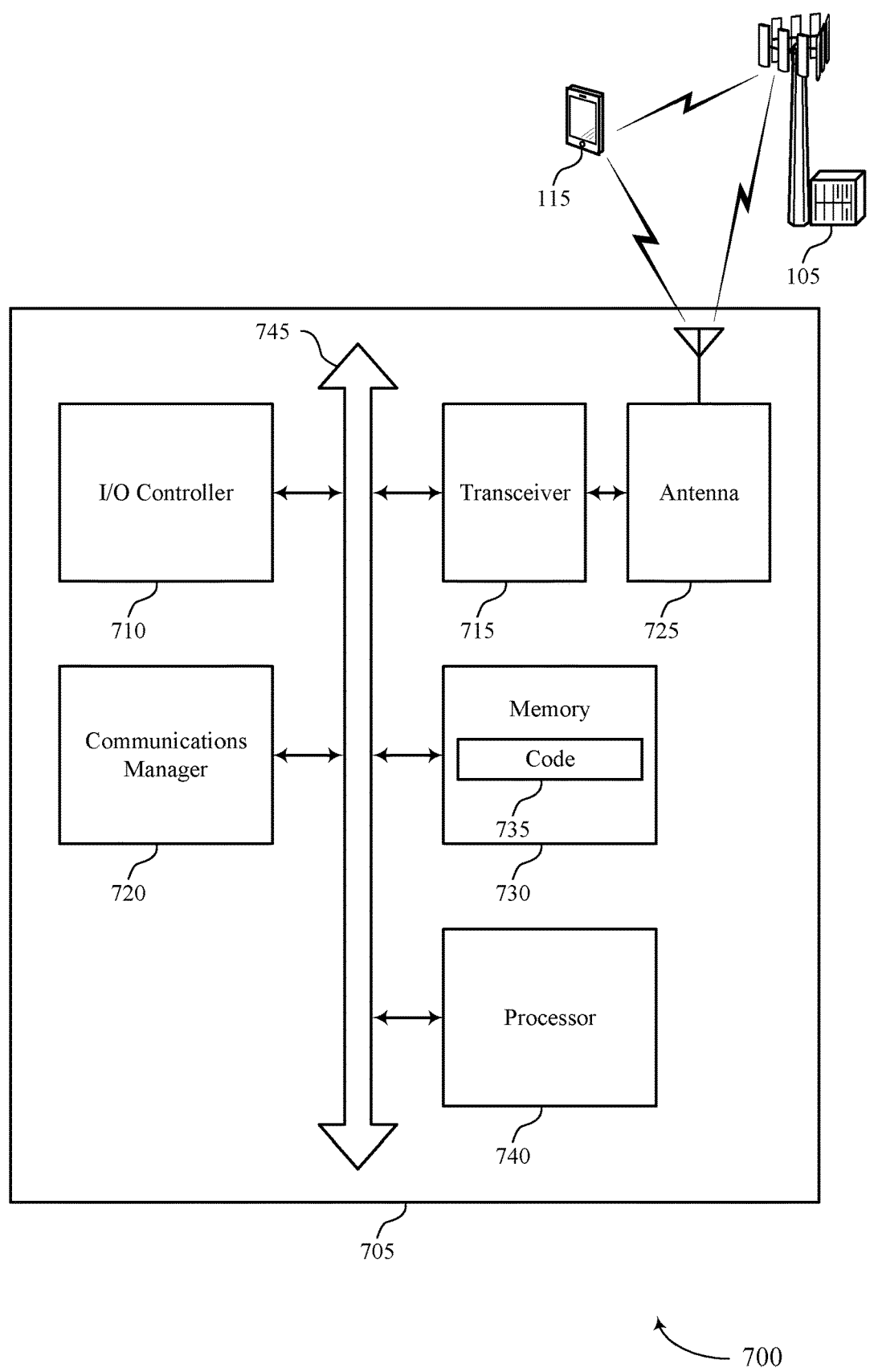
FIG. 7 shows a diagram of a system including a device that supports channel feedback for updating MCS in accordance with aspects of the present disclosure.

FIG. 7 shows a diagram of a system 700 including a device 705 that supports channel feedback for updating MCS in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting updating an MCS in feedback). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a base station, a transmission including a data block modulated according to an MCS. The communications manager 720 may be configured as or otherwise support a means for transmitting, based on a result of a decoding process of the received transmission, a feedback message including a value selected from a codebook including a set of values, where the set of values includes a first subset of values indicating that the decoding process was successful and second subset of values indicating that the decoding process was unsuccessful, and where a first value of the first subset of values indicates an increase to the modulation and coding scheme of a first delta value and a second value of the second subset of values indicates a decrease to the MCS of a second delta value.

By including or configuring the communications manager 720 in accordance with examples as described herein, the device 705 may support techniques for a UE 115 to transmit a value from a codebook indicating a delta value for an updated MCS in a feedback message to a base station 105, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of updating an MCS in feedback as described herein, or the processor 740 and the memory 730 may be otherwise configured to perform or support such operations.

Figure 8:
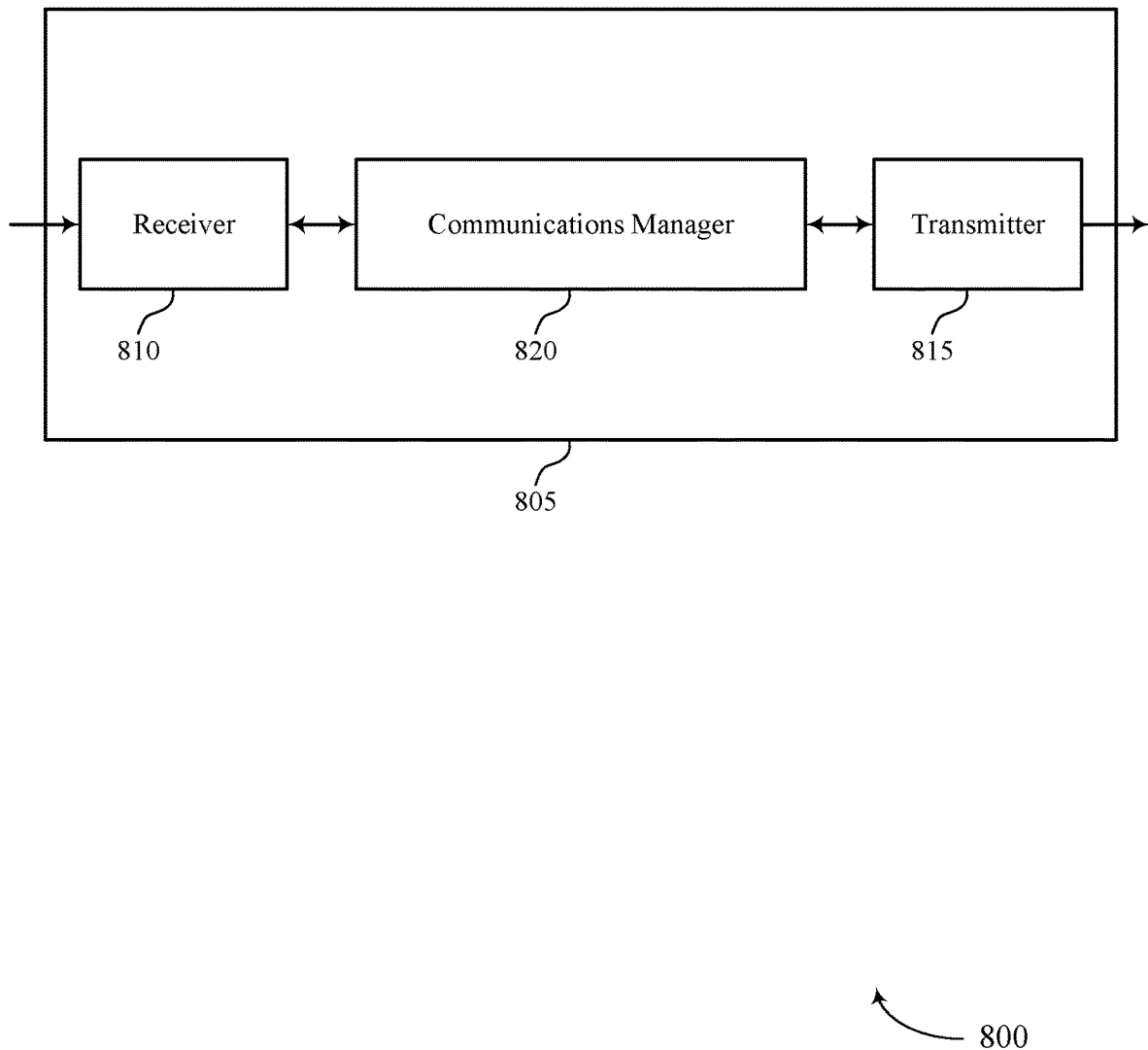
FIGS. 8 and 9 show block diagrams of devices that support channel feedback for updating MCS in accordance with aspects of the present disclosure.

FIG. 8 shows a block diagram 800 of a device 805 that supports channel feedback for updating MCS in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to updating an MCS in feedback). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to updating an MCS in feedback). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of updating an MCS in feedback as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for transmitting, to a UE, a transmission including a data block modulated according to an MCS. The communications manager 820 may be configured as or otherwise support a means for receiving, based on a result of a decoding process of the received transmission, a feedback message including a value selected from a codebook including a set of values, where the set of values includes a first subset of values of the set of values indicating that the decoding process was successful and second subset of values of the set of values indicating that the decoding process was unsuccessful, and where a first value of the first subset of values indicates an increase to the MCS of a first delta value and a second value of the second subset of values indicates a decrease to the MCS of a second delta value.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for a UE 115 to transmit a value from a codebook indicating a delta value for an updated MCS in a feedback message to a base station 105, which may cause reduced processing, reduced power consumption, more efficient utilization of communication resources, and the like.

Figure 9:
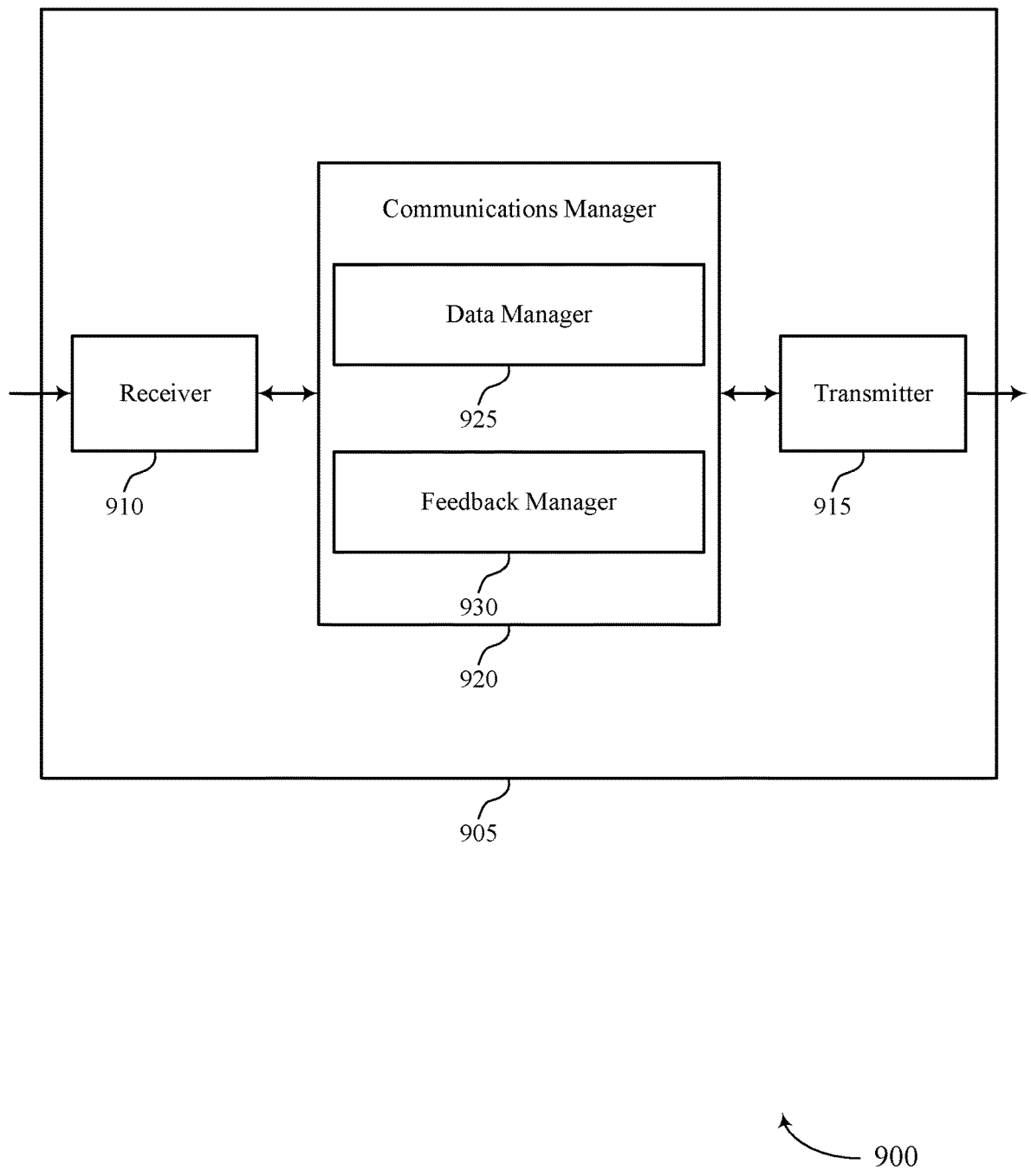

FIG. 9 shows a block diagram 900 of a device 905 that supports channel feedback for updating MCS in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to updating an MCS in feedback). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to updating an MCS in feedback). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of updating an MCS in feedback as described herein. For example, the communications manager 920 may include a data manager 925 a feedback manager 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The data manager 925 may be configured as or otherwise support a means for transmitting, to a UE, a transmission including a data block modulated according to an MCS. The feedback manager 930 may be configured as or otherwise support a means for receiving, based on a result of a decoding process of the received transmission, a feedback message including a value selected from a codebook including a set of values, where the set of values includes a first subset of values of the set of values indicating that the decoding process was successful and second subset of values of the set of values indicating that the decoding process was unsuccessful, and where a first value of the first subset of values indicates an increase to the MCS of a first delta value and a second value of the second subset of values indicates a decrease to the MCS of a second delta value.

Figure 10:
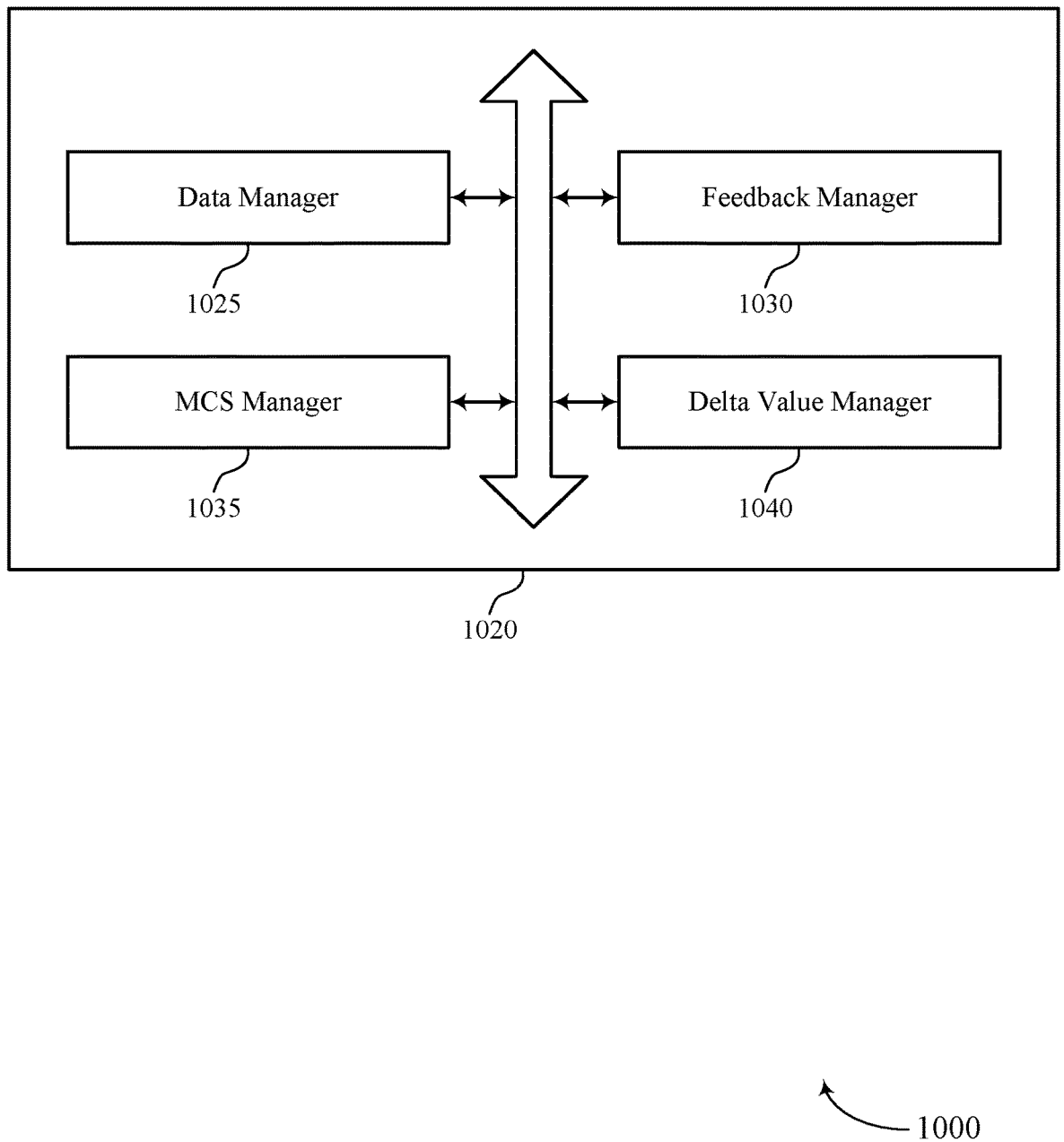
FIG. 10 shows a block diagram of a communications manager that supports channel feedback for updating MCS in accordance with aspects of the present disclosure.

FIG. 10 shows a block diagram 1000 of a communications manager 1020 that supports channel feedback for updating MCS in accordance with aspects of the present disclosure. The communications manager 1020 may be an example of aspects of a communications manager 820, a communications manager 920, or both, as described herein. The communications manager 1020, or various components thereof, may be an example of means for performing various aspects of updating an MCS in feedback as described herein. For example, the communications manager 1020 may include a data manager 1025, a feedback manager 1030, an MCS manager 1035, a delta value manager 1040, or any combination thereof. Each of these components may communicate, directly or indirectly, with one another (e.g., via one or more buses).

The communications manager 1020 may support wireless communications at a base station in accordance with examples as disclosed herein. The data manager 1025 may be configured as or otherwise support a means for transmitting, to a UE, a transmission including a data block modulated according to an MCS. The feedback manager 1030 may be configured as or otherwise support a means for receiving, based on a result of a decoding process of the received transmission, a feedback message including a value selected from a codebook including a set of values, where the set of values includes a first subset of values of the set of values indicating that the decoding process was successful and second subset of values of the set of values indicating that the decoding process was unsuccessful, and where a first value of the first subset of values indicates an increase to the MCS of a first delta value and a second value of the second subset of values indicates a decrease to the MCS of a second delta value.

In some examples, a first quantity of the first subset of values is different than a second quantity of the second subset of values.

In some examples, the MCS manager 1035 may be configured as or otherwise support a means for determining the set of values of the codebook based on the MCS.

In some examples, to support determining the set of values, the MCS manager 1035 may be configured as or otherwise support a means for comparing the MCS to a threshold MCS.

In some examples, to support determining the set of values, the MCS manager 1035 may be configured as or otherwise support a means for determining a first quantity of values in the first subset of values and a second quantity of values of the second subset of values based on the MCS.

In some examples, the delta value manager 1040 may be configured as or otherwise support a means for determining the first delta value or the second delta value based on the MCS.

In some examples, the delta value manager 1040 may be configured as or otherwise support a means for modifying at least one of the first delta value or the second delta value based on determining that a first spectral efficiency associated with the MCS is within a threshold of a second spectral efficiency associated with an adjacent modulation order.

In some examples, the feedback manager 1030 may be configured as or otherwise support a means for updating the MCS according to the value in the feedback message. In some examples, the data manager 1025 may be configured as or otherwise support a means for transmitting, to the UE, a retransmission including the data block modulated according to the updated MCS.

In some examples, the MCS manager 1035 may be configured as or otherwise support a means for transmitting, to the UE, RRC signaling configuring the codebook.

In some examples, a third value of the first subset of values indicates a decrease to the MCS.

Figure 11:
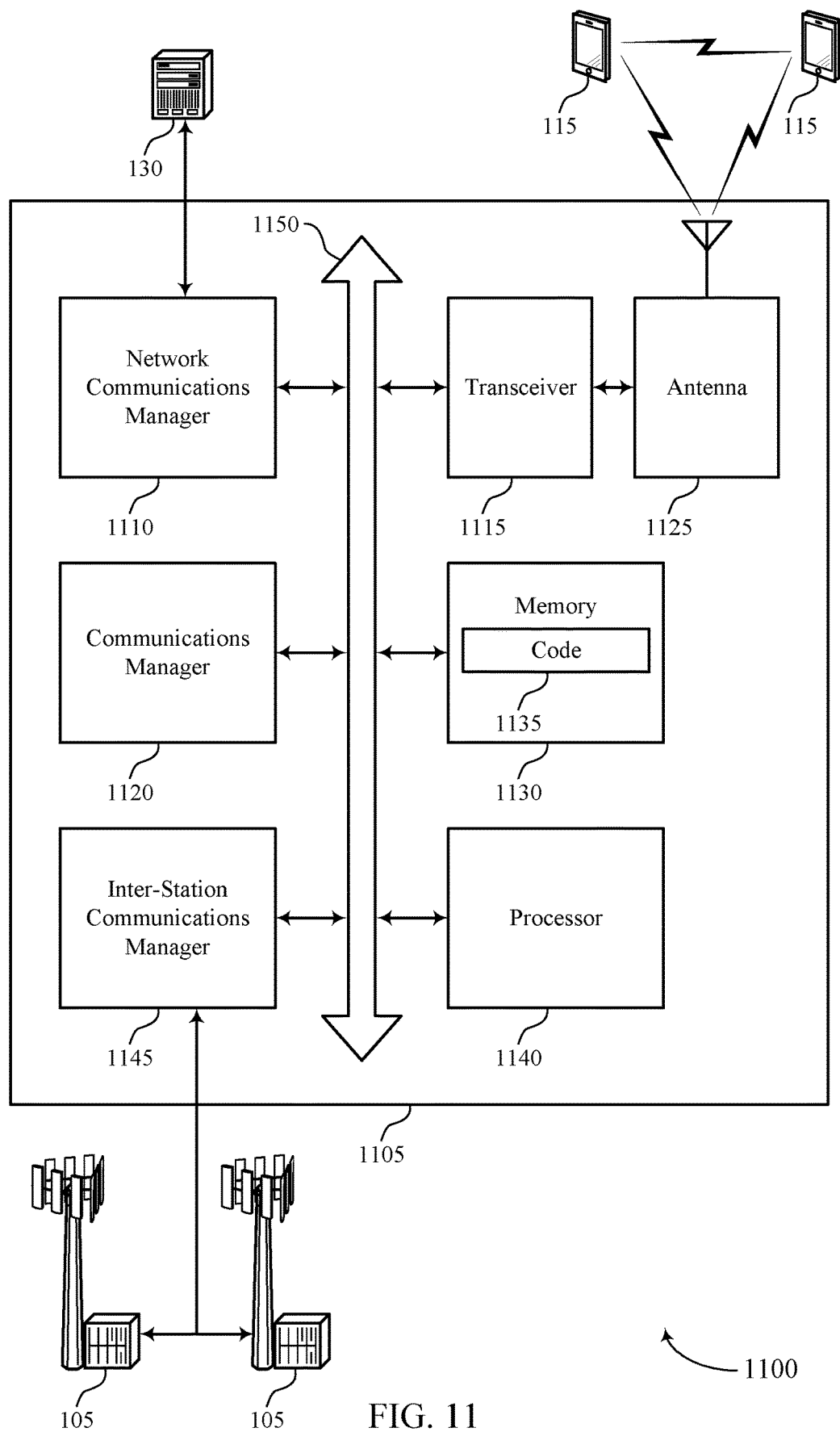
FIG. 11 shows a diagram of a system including a device that supports channel feedback for updating MCS in accordance with aspects of the present disclosure.

FIG. 11 shows a diagram of a system 1100 including a device 1105 that supports channel feedback for updating MCS in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting updating an MCS in feedback). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for transmitting, to a UE, a transmission including a data block modulated according to an MCS. The communications manager 1120 may be configured as or otherwise support a means for receiving, based on a result of a decoding process of the received transmission, a feedback message including a value selected from a codebook including a set of values, where the set of values includes a first subset of values of the set of values indicating that the decoding process was successful and second subset of values of the set of values indicating that the decoding process was unsuccessful, and where a first value of the first subset of values indicates an increase to the MCS of a first delta value and a second value of the second subset of values indicates a decrease to the MCS of a second delta value.

By including or configuring the communications manager 1120 in accordance with examples as described herein, the device 1105 may support techniques for a UE 115 to transmit a value from a codebook indicating a delta value for an updated MCS in a feedback message to a base station 105, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of updating an MCS in feedback as described herein, or the processor 1140 and the memory 1130 may be otherwise configured to perform or support such operations.

Figure 12:
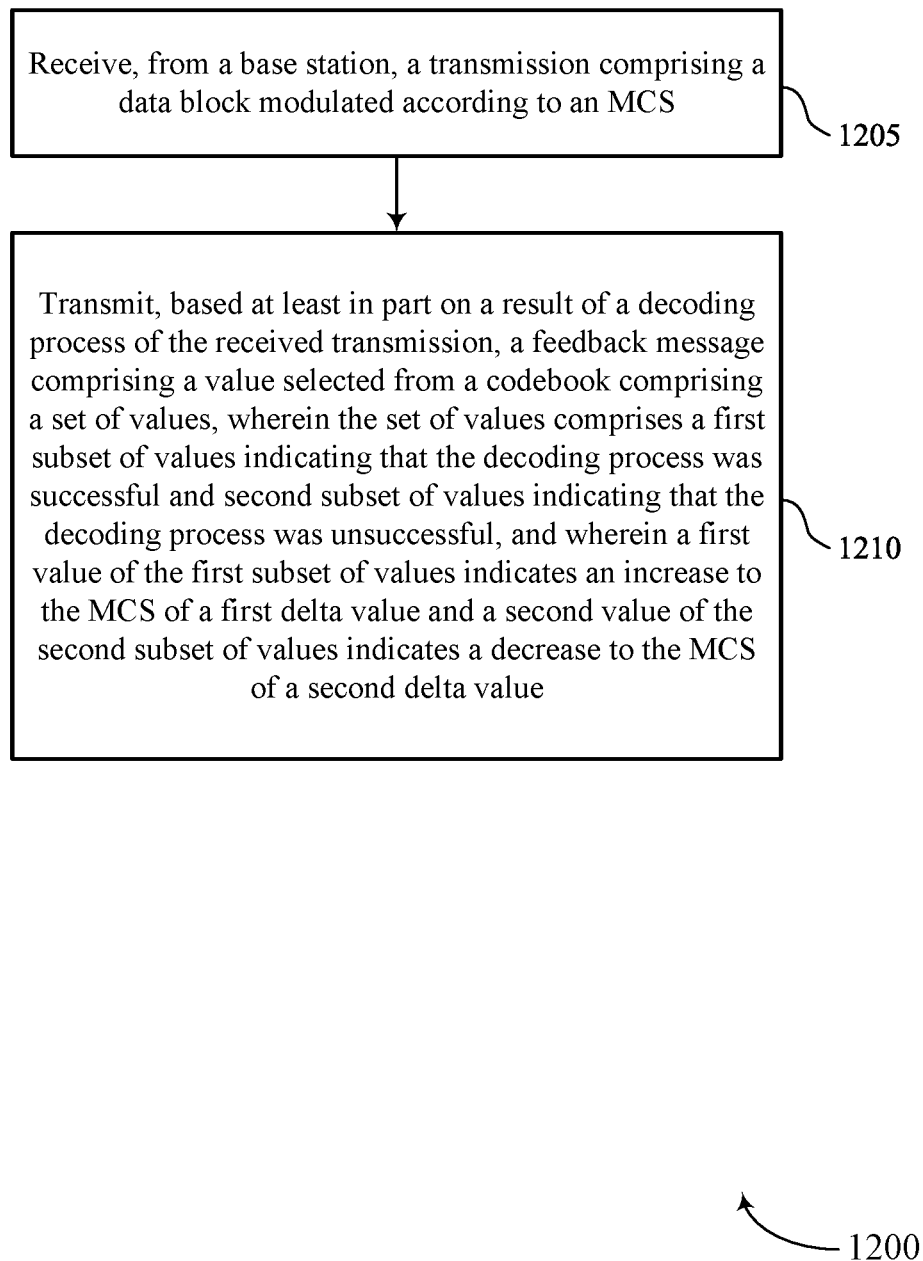
FIGS. 12 through 15 show flowcharts illustrating methods that support channel feedback for updating MCS in accordance with aspects of the present disclosure.

FIG. 12 shows a flowchart illustrating a method 1200 that supports channel feedback for updating MCS in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a transmission including a data block modulated according to an MCS. The operations of 1205 may be performed in accordance with examples as disclosed herein. In some examples, aspects of the operations of 1205 may be performed by a data component 625 as described with reference to FIG. 6.

At 1210, the method may include transmitting, based on a result of a decoding process of the received transmission, a feedback message including a value selected from a codebook including a set of values, where the set of values includes a first subset of values indicating that the decoding process was successful and second subset of values indicating that the decoding process was unsuccessful, and where a first value of the first subset of values indicates an increase to the modulation and coding scheme of a first delta value and a second value of the second subset of values indicates a decrease to the MCS of a second delta value. The operations of 1210 may be performed in accordance with examples as disclosed herein. In some examples, aspects of the operations of 1210 may be performed by a feedback component 630 as described with reference to FIG. 6.

Figure 13:
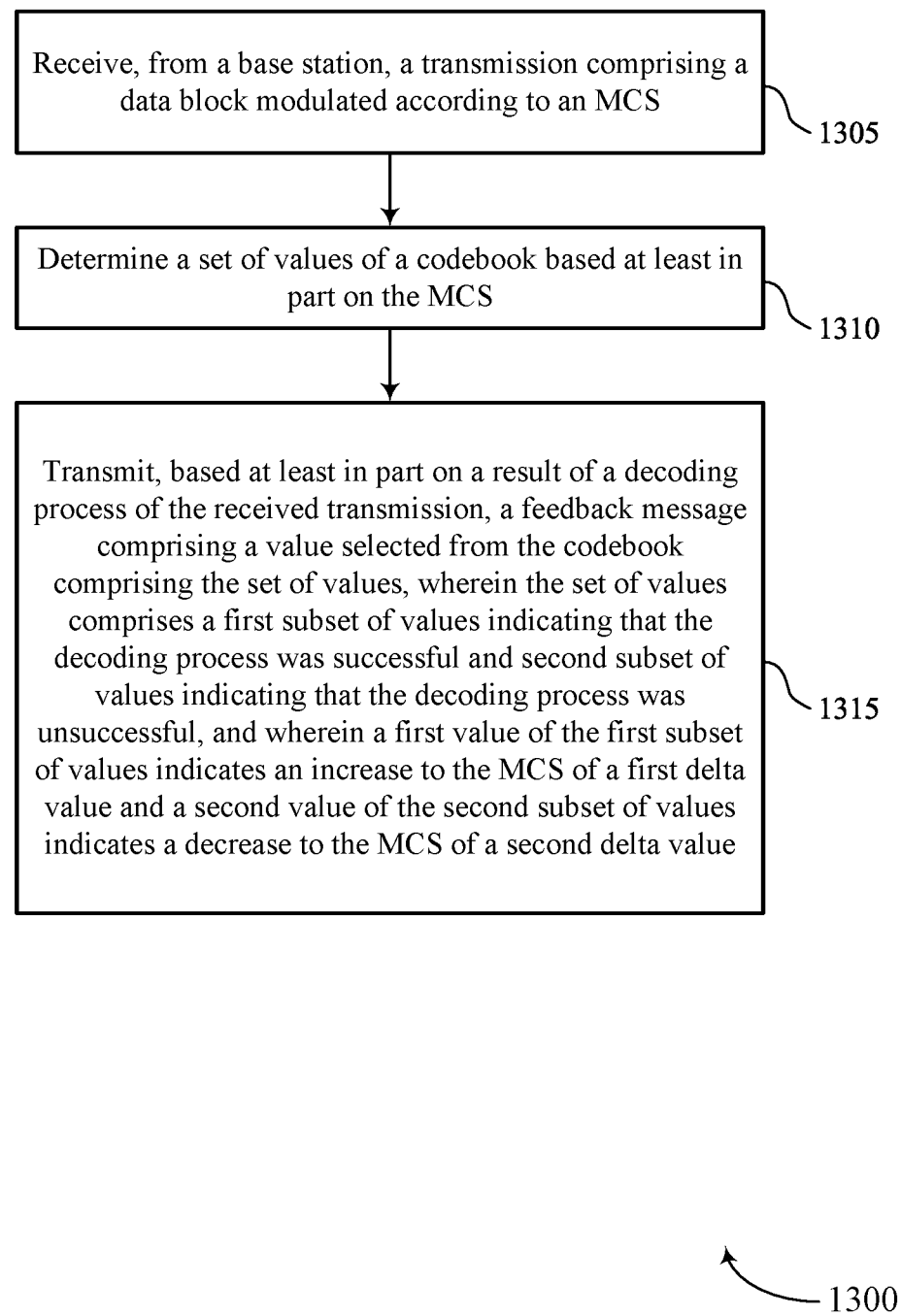

FIG. 13 shows a flowchart illustrating a method 1300 that supports channel feedback for updating MCS in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a transmission including a data block modulated according to an MCS. The operations of 1305 may be performed in accordance with examples as disclosed herein. In some examples, aspects of the operations of 1305 may be performed by a data component 625 as described with reference to FIG. 6.

At 1310, the method may include determining a set of values of a codebook based on the MCS. The operations of 1310 may be performed in accordance with examples as disclosed herein. In some examples, aspects of the operations of 1310 may be performed by an MCS component 635 as described with reference to FIG. 6.

At 1315, the method may include transmitting, based on a result of a decoding process of the received transmission, a feedback message including the value selected from the codebook including a set of values, where the set of values includes a first subset of values indicating that the decoding process was successful and second subset of values indicating that the decoding process was unsuccessful, and where a first value of the first subset of values indicates an increase to the modulation and coding scheme of a first delta value and a second value of the second subset of values indicates a decrease to the MCS of a second delta value. The operations of 1315 may be performed in accordance with examples as disclosed herein. In some examples, aspects of the operations of 1315 may be performed by a feedback component 630 as described with reference to FIG. 6.

Figure 14:
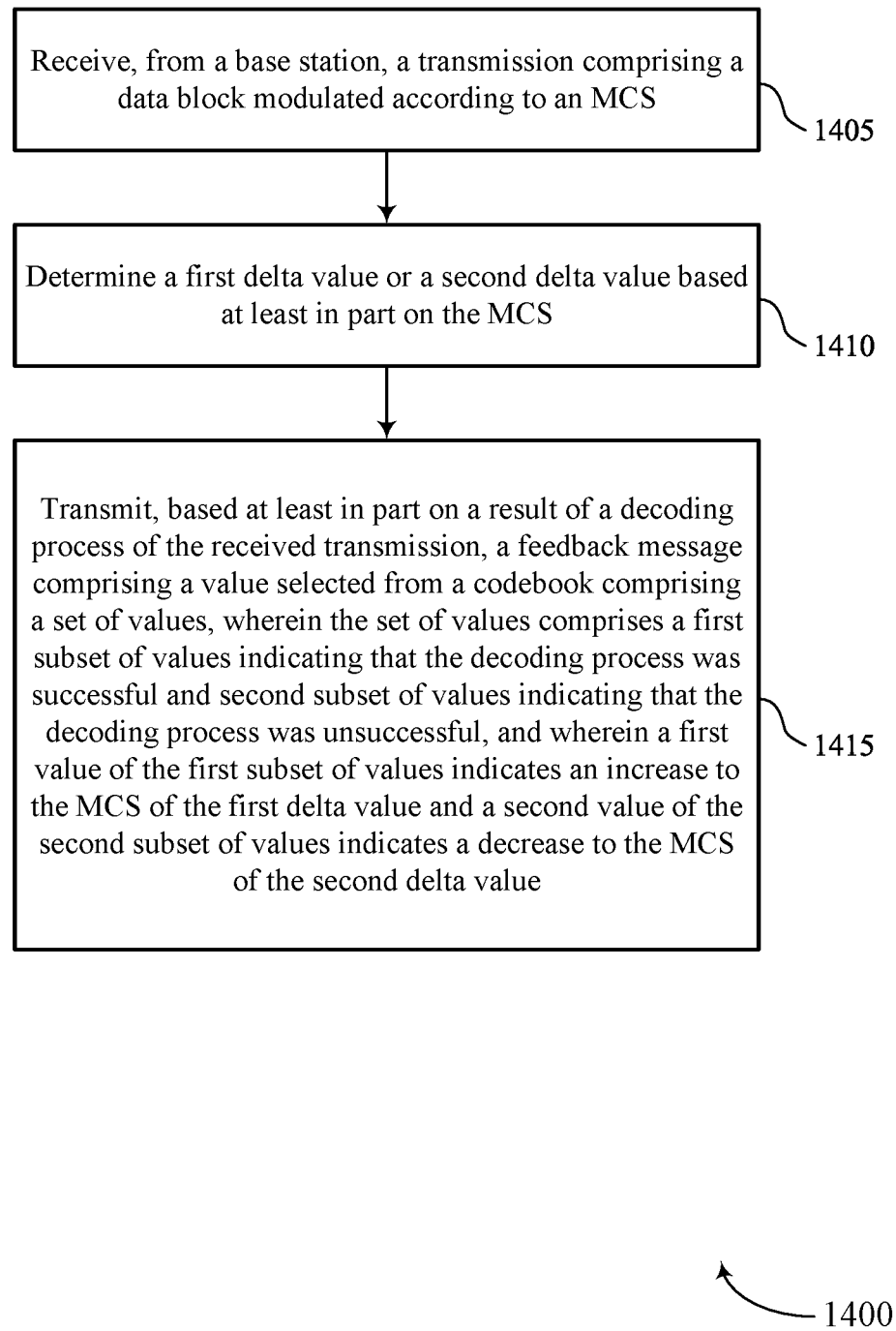

FIG. 14 shows a flowchart illustrating a method 1400 that supports channel feedback for updating MCS in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a transmission including a data block modulated according to an MCS. The operations of 1405 may be performed in accordance with examples as disclosed herein. In some examples, aspects of the operations of 1405 may be performed by a data component 625 as described with reference to FIG. 6.

At 1410, the method may include determining a first delta value or a second delta value based on the MCS. The operations of 1410 may be performed in accordance with examples as disclosed herein. In some examples, aspects of the operations of 1410 may be performed by a delta value component 640 as described with reference to FIG. 6.

At 1415, the method may include transmitting, based on a result of a decoding process of the received transmission, a feedback message including a value selected from a codebook including a set of values, where the set of values includes a first subset of values indicating that the decoding process was successful and second subset of values indicating that the decoding process was unsuccessful, and where a first value of the first subset of values indicates an increase to the MCS of the first delta value and a second value of the second subset of values indicates a decrease to the MCS of the second delta value. The operations of 1415 may be performed in accordance with examples as disclosed herein. In some examples, aspects of the operations of 1415 may be performed by a feedback component 630 as described with reference to FIG. 6.

Figure 15:
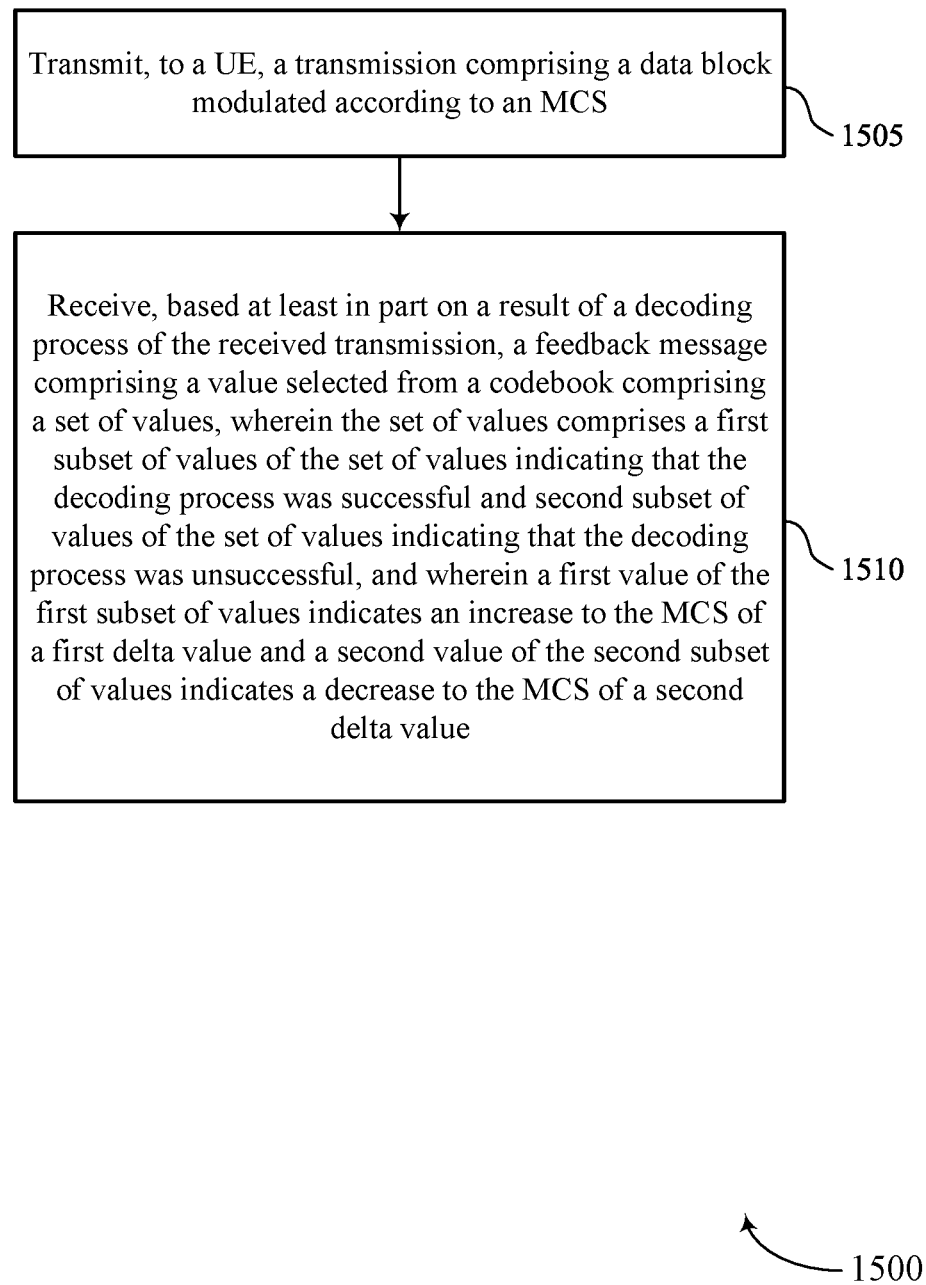

FIG. 15 shows a flowchart illustrating a method 1500 that supports channel feedback for updating MCS in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a transmission including a data block modulated according to an MCS. The operations of 1505 may be performed in accordance with examples as disclosed herein. In some examples, aspects of the operations of 1505 may be performed by a data manager 1025 as described with reference to FIG. 10.

At 1510, the method may include receiving, based on a result of a decoding process of the received transmission, a feedback message including a value selected from a codebook including a set of values, where the set of values includes a first subset of values of the set of values indicating that the decoding process was successful and second subset of values of the set of values indicating that the decoding process was unsuccessful, and where a first value of the first subset of values indicates an increase to the MCS of a first delta value and a second value of the second subset of values indicates a decrease to the MCS of a second delta value. The operations of 1510 may be performed in accordance with examples as disclosed herein. In some examples, aspects of the operations of 1510 may be performed by a feedback manager 1030 as described with reference to FIG. 10. The following provides an overview of aspects of the present disclosure:

Aspect 1: A method for wireless communications at a UE, comprising: receiving, from a base station, a transmission comprising a data block modulated according to a modulation and coding scheme; and transmitting, based at least in part on a result of a decoding process of the received transmission, a feedback message comprising a value selected from a codebook comprising a set of values, wherein the set of values comprises a first subset of values indicating that the decoding process was successful and second subset of values indicating that the decoding process was unsuccessful, and wherein a first value of the first subset of values indicates an increase to the modulation and coding scheme of a first delta value and a second value of the second subset of values indicates a decrease to the modulation and coding scheme of a second delta value.

Aspect 2: The method of aspect 1, wherein a first quantity of the first subset of values is different than a second quantity of the second subset of values.

Aspect 3: The method of any of aspects 1 through 2, further comprising: determining the set of values of the codebook based at least in part on the modulation and coding scheme.

Aspect 4: The method of aspect 3, wherein determining the set of values comprises: comparing the modulation and coding scheme to a threshold modulation and coding scheme.

Aspect 5: The method of any of aspects 3 through 4, wherein determining the set of values comprises: determining a first quantity of values in the first subset of values and a second quantity of values of the second subset of values based at least in part on the modulation and coding scheme.

Aspect 6: The method of any of aspects 1 through 5, further comprising: determining the first delta value or the second delta value based at least in part on the modulation and coding scheme.

Aspect 7: The method of any of aspects 1 through 6, further comprising: modifying at least one of the first delta value or the second delta value based at least in part on determining that a first spectral efficiency associated with the modulation and coding scheme is within a threshold of a second spectral efficiency associated with an adjacent modulation order.

Aspect 8: The method of any of aspects 1 through 7, further comprising: receiving, from the base station and based at least in part on transmitting the feedback message comprising the value, a retransmission comprising the data block modulated according to an updated modulation and coding scheme.

Aspect 9: The method of any of aspects 1 through 8, further comprising: receiving, from the base station, radio resource control signaling configuring the codebook.

Aspect 10: The method of any of aspects 1 through 9, wherein a third value of the first subset of values indicates a decrease to the modulation and coding scheme.

Aspect 11: A method for wireless communications at a base station, comprising: transmitting, to a UE, a transmission comprising a data block modulated according to a modulation and coding scheme; and receiving, based at least in part on a result of a decoding process of the received transmission, a feedback message comprising a value selected from a codebook comprising a set of values, wherein the set of values comprises a first subset of values of the set of values indicating that the decoding process was successful and second subset of values of the set of values indicating that the decoding process was unsuccessful, and wherein a first value of the first subset of values indicates an increase to the modulation and coding scheme of a first delta value and a second value of the second subset of values indicates a decrease to the modulation and coding scheme of a second delta value.

Aspect 12: The method of aspect 11, wherein a first quantity of the first subset of values is different than a second quantity of the second subset of values.

Aspect 13: The method of any of aspects 11 through 12, further comprising: determining the set of values of the codebook based at least in part on the modulation and coding scheme.

Aspect 14: The method of aspect 13, wherein determining the set of values comprises: comparing the modulation and coding scheme to a threshold modulation and coding scheme.

Aspect 15: The method of any of aspects 13 through 14, wherein determining the set of values comprises: determining a first quantity of values in the first subset of values and a second quantity of values of the second subset of values based at least in part on the modulation and coding scheme.

Aspect 16: The method of any of aspects 11 through 15, further comprising: determining the first delta value or the second delta value based at least in part on the modulation and coding scheme.

Aspect 17: The method of any of aspects 11 through 16, further comprising: modifying at least one of the first delta value or the second delta value based at least in part on determining that a first spectral efficiency associated with the modulation and coding scheme is within a threshold of a second spectral efficiency associated with an adjacent modulation order.

Aspect 18: The method of any of aspects 11 through 17, further comprising: updating the modulation and coding scheme according to the value in the feedback message; and transmitting, to the UE, a retransmission comprising the data block modulated according to the updated modulation and coding scheme.

Aspect 19: The method of any of aspects 11 through 18, further comprising: transmitting, to the UE, radio resource control signaling configuring the codebook.

Aspect 20: The method of any of aspects 11 through 19, wherein a third value of the first subset of values indicates a decrease to the modulation and coding scheme.

Aspect 21: An apparatus for wireless communications at a UE, comprising a processor; memory coupled with the processor; and instructions stored in the memory and executable by the processor to cause the apparatus to perform a method of any of aspects 1 through 10.

Aspect 22: An apparatus for wireless communications at a UE, comprising at least one means for performing a method of any of aspects 1 through 10.

Aspect 23: A non-transitory computer-readable medium storing code for wireless communications at a UE, the code comprising instructions executable by a processor to perform a method of any of aspects 1 through 10.

Aspect 24: An apparatus for wireless communications at a base station, comprising a processor; memory coupled with the processor; and instructions stored in the memory and executable by the processor to cause the apparatus to perform a method of any of aspects 11 through 20.

Aspect 25: An apparatus for wireless communications at a base station, comprising at least one means for performing a method of any of aspects 11 through 20.

Aspect 26: A non-transitory computer-readable medium storing code for wireless communications at a base station, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   memory coupled with the one or more processors; and
   instructions stored in the memory and executable by the one or more processors to cause the apparatus to:
      receive, from a network entity, a transmission comprising a data block modulated according to a modulation and coding scheme scheduled by the network entity; and
      transmit, based at least in part on a result of a decoding process of the received transmission, a feedback message comprising a codepoint selected from a codebook comprising a set of codepoints corresponding to respective types of feedback and respective delta values, wherein the set of codepoints comprises a first subset of codepoints indicating that the decoding process was successful and a second subset of codepoints indicating that the decoding process was unsuccessful, and wherein a first codepoint of the first subset of codepoints indicates an increase to the modulation and coding scheme of a first delta value and a second codepoint of the second subset of codepoints indicates a decrease to the modulation and coding scheme of a second delta value, and wherein the respective types of feedback or the respective delta values corresponding to the set of codepoints of the codebook are a function of the modulation and coding scheme scheduled by the network entity.

2. The apparatus of claim 1, wherein a first quantity of the first subset of codepoints is different than a second quantity of the second subset of codepoints.

3. The apparatus of claim 1, wherein the instructions are further executable by the one or more processors to cause the apparatus to:
determine the respective types of feedback and respective delta values indicated by the set of codepoints of the codebook based at least in part on the modulation and coding scheme.

4. The apparatus of claim 3, wherein the instructions to determine the respective types of feedback and respective delta values indicated by the set of codepoints are executable by the one or more processors to cause the apparatus to:
compare the modulation and coding scheme to a threshold modulation and coding scheme.

5. The apparatus of claim 3, wherein the instructions to determine the respective types of feedback and respective delta values indicated by the set of codepoints are executable by the one or more processors to cause the apparatus to:
determine a first quantity of codepoints in the first subset of codepoints and a second quantity of codepoints of the second subset of codepoints based at least in part on the modulation and coding scheme.

6. The apparatus of claim 1, wherein the instructions are further executable by the one or more processors to cause the apparatus to:
determine the first delta value or the second delta value based at least in part on the modulation and coding scheme.

7. The apparatus of claim 1, wherein the instructions are further executable by the one or more processors to cause the apparatus to:
modify at least one of the first delta value or the second delta value based at least in part on determining that a first spectral efficiency associated with the modulation and coding scheme is within a threshold of a second spectral efficiency associated with an adjacent modulation order.

8. The apparatus of claim 1, wherein the instructions are further executable by the one or more processors to cause the apparatus to:
receive, from the network entity and based at least in part on transmitting the feedback message comprising the codepoint, a retransmission comprising the data block modulated according to an updated modulation and coding scheme.

9. The apparatus of claim 1, wherein the instructions are further executable by the one or more processors to cause the apparatus to:
receive, from the network entity, radio resource control signaling configuring the codebook.

10. The apparatus of claim 1, wherein a third codepoint of the first subset of codepoints indicates a decrease to the modulation and coding scheme.

11. An apparatus for wireless communications at a network entity, comprising:
one or more processors;
memory coupled with the one or more processors; and
instructions stored in the memory and executable by the one or more processors to cause the apparatus to:
transmit, to a user equipment (UE), a transmission comprising a data block modulated according to a modulation and coding scheme scheduled by the network entity; and
receive, based at least in part on a result of a decoding process of the transmission, a feedback message comprising a codepoint selected from a codebook comprising a set of codepoints corresponding to respective types of feedback and respective delta values, wherein the set of codepoints comprises a first subset of codepoints indicating that the decoding process was successful and a second subset of codepoints indicating that the decoding process was unsuccessful, and wherein a first codepoint of the first subset of codepoints indicates an increase to the modulation and coding scheme of a first delta value and a second codepoint of the second subset of codepoints indicates a decrease to the modulation and coding scheme of a second delta value, and wherein the respective types of feedback or the respective delta values the set of codepoints of the codebook are a function of the modulation and coding scheme scheduled by the network entity.

12. The apparatus of claim 11, wherein a first quantity of the first subset of codepoints is different than a second quantity of the second subset of codepoints.

13. The apparatus of claim 11, wherein the instructions are further executable by the one or more processors to cause the apparatus to:
determine the respective types of feedback and respective delta values indicated by the set of codepoints of the codebook based at least in part on the modulation and coding scheme.

14. The apparatus of claim 13, wherein the instructions to determine the respective types of feedback and respective delta values indicated by the set of codepoints are executable by the one or more processors to cause the apparatus to:
compare the modulation and coding scheme to a threshold modulation and coding scheme.

15. The apparatus of claim 13, wherein the instructions to determine the respective types of feedback and respective delta values indicated by the set of codepoints are executable by the one or more processors to cause the apparatus to:
determine a first quantity of codepoints in the first subset of codepoints and a second quantity of codepoints of the second subset of codepoints based at least in part on the modulation and coding scheme.

16. The apparatus of claim 11, wherein the instructions are further executable by the one or more processors to cause the apparatus to:
determine the first delta value or the second delta value based at least in part on the modulation and coding scheme.

17. The apparatus of claim 11, wherein the instructions are further executable by the one or more processors to cause the apparatus to:
modify at least one of the first delta value or the second delta value based at least in part on determining that a first spectral efficiency associated with the modulation and coding scheme is within a threshold of a second spectral efficiency associated with an adjacent modulation order.

18. The apparatus of claim 11, wherein the instructions are further executable by the one or more processors to cause the apparatus to:
update the modulation and coding scheme according to the value codepoint in the feedback message; and
transmit, to the UE, a retransmission comprising the data block modulated according to the updated modulation and coding scheme.

19. The apparatus of claim 11, wherein the instructions are further executable by the one or more processors to cause the apparatus to:
transmit, to the UE, radio resource control signaling configuring the codebook.

20. The apparatus of claim 11, wherein a third codepoint of the first subset of codepoints indicates a decrease to the modulation and coding scheme.

21. A method for wireless communications at a user equipment (UE), comprising:
receiving, from a network entity, a transmission comprising a data block modulated according to a modulation and coding scheme scheduled by the network entity; and
transmitting, based at least in part on a result of a decoding process of the received transmission, a feedback message comprising a codepoint selected from a codebook comprising a set of codepoints corresponding to respective types of feedback and respective delta values, wherein the set of codepoints comprises a first subset of codepoints indicating that the decoding process was successful and a second subset of codepoints indicating that the decoding process was unsuccessful, and wherein a first codepoint of the first subset of codepoints indicates an increase to the modulation and coding scheme of a first delta value and a second codepoint of the second subset of codepoints indicates a decrease to the modulation and coding scheme of a second delta value, and wherein the respective types of feedback or the respective delta values corresponding to the set of codepoints of the codebook are a function of the modulation and coding scheme scheduled by the network entity.

22. The method of claim 21, wherein a first quantity of the first subset of codepoints is different than a second quantity of the second subset of codepoints.

23. The method of claim 21, further comprising:
determining the respective types of feedback and respective delta values indicated by the set of codepoints of the codebook based at least in part on the modulation and coding scheme.

24. The method of claim 23, wherein determining the respective types of feedback and respective delta values indicated by the set of codepoints comprises:
comparing the modulation and coding scheme to a threshold modulation and coding scheme.

25. The method of claim 21, further comprising:
determining the first delta value or the second delta value based at least in part on the modulation and coding scheme.

26. The method of claim 21, further comprising:
modifying at least one of the first delta value or the second delta value based at least in part on determining that a first spectral efficiency associated with the modulation and coding scheme is within a threshold of a second spectral efficiency associated with an adjacent modulation order.

27. The method of claim 21, further comprising:
receiving, from the network entity and based at least in part on transmitting the feedback message comprising the codepoint, a retransmission comprising the data block modulated according to an updated modulation and coding scheme.

28. The method of claim 21, further comprising:
receiving, from the network entity, radio resource control signaling configuring the codebook.

29. The method of claim 21, wherein a third codepoint of the first subset of codepoints indicates a decrease to the modulation and coding scheme.

30. A method for wireless communications at a network entity, comprising:
transmitting, to a user equipment (UE), a transmission comprising a data block modulated according to a modulation and coding scheme scheduled by the network entity; and
receiving, based at least in part on a result of a decoding process of the receive transmission, a feedback message comprising a codepoint selected from a codebook comprising a set of codepoints corresponding to respective types of feedback and respective delta values, wherein the set of codepoints comprises a first subset of codepoints indicating that the decoding process was successful and a second subset of codepoints indicating that the decoding process was unsuccessful, and wherein a first codepoint of the first subset of codepoints indicates an increase to the modulation and coding scheme of a first delta and a second codepoint of the second subset of codepoints indicates a decrease to the modulation and coding scheme of a second delta value, and wherein the respective types of feedback or the respective delta values the set of codepoints of the codebook are a function of the modulation and coding scheme scheduled by the network entity.

* * * * *